(12) United States Patent
Ogawa et al.

(10) Patent No.: US 10,804,517 B2
(45) Date of Patent: Oct. 13, 2020

(54) ALKALINE BATTERY SEPARATOR AND ALKALINE BATTERY

(71) Applicant: NIPPON KODOSHI CORPORATION, Kochi-Shi, Kochi (JP)

(72) Inventors: Kentaro Ogawa, Kochi (JP); Naoya Kawazawa, Kochi (JP); Masahiro Kuroiwa, Kochi (JP)

(73) Assignee: Nippon Kodoshi Corporation, Kochi (JP)

(*) Notice: Subject to any disclaimer, the term of this patent is extended or adjusted under 35 U.S.C. 154(b) by 0 days.

(21) Appl. No.: 16/079,741

(22) PCT Filed: Feb. 27, 2017

(86) PCT No.: PCT/JP2017/007458
§ 371 (c)(1),
(2) Date: Aug. 24, 2018

(87) PCT Pub. No.: WO2017/150439
PCT Pub. Date: Sep. 8, 2017

(65) Prior Publication Data
US 2019/0074499 A1  Mar. 7, 2019

(30) Foreign Application Priority Data

Feb. 29, 2016 (JP) .................................. 2016-038282
Feb. 29, 2016 (JP) .................................. 2016-038283

(51) Int. Cl.
*H01M 2/16* (2006.01)
*C08L 1/02* (2006.01)
*H01M 10/24* (2006.01)

(52) U.S. Cl.
CPC ............. *H01M 2/1626* (2013.01); *C08L 1/02* (2013.01); *H01M 2/162* (2013.01); *H01M 10/24* (2013.01); *H01M 2300/0014* (2013.01)

(58) Field of Classification Search
CPC . C08L 1/02; H01M 10/24; H01M 2300/0014; H01M 2/162; H01M 2/1626
See application file for complete search history.

(56) References Cited

U.S. PATENT DOCUMENTS 5,366,832 A * 11/1994 Hayashi .............. H01M 2/1633
429/249
2003/0096171 A1  5/2003 Thrasher et al.

FOREIGN PATENT DOCUMENTS

JP  2005-525675 A  8/2005
JP  2014-026877 A  2/2014
(Continued)

OTHER PUBLICATIONS

Machine Translation JP2014123443(A) (Year: 2014).*

*Primary Examiner* — Victoria H Lynch
(74) *Attorney, Agent, or Firm* — Carrier Blackman & Associates, P.C.; William D. Blackman; Joseph P. Carrier

(57) ABSTRACT

The present invention provides a separator for alkaline batteries and an alkaline battery improving reliability of prevention in internal short-circuits, and having good liquid retention and shielding property. To achieve this, the separator for alkaline batteries is made from a wet nonwoven fabric which contains at least alkali-resistant cellulose fibers and alkali-resistant synthetic fibers bound using a binder component; wherein an average pore diameter of the wet nonwoven fabric is 1 to 10 μm. Moreover, the separator for alkaline batteries uses the wet nonwoven fabric having a maximum pore diameter of 20 to 60 μm, a liquid retention rate of 400 to 700% during immersion in a 40% by mass
(Continued)

KOH solution, and a swelling ratio of 30 to 45% during immersion in a 40% by mass KOH solution.

14 Claims, 1 Drawing Sheet

(56) References Cited

FOREIGN PATENT DOCUMENTS

| | | | | | |
|---|---|---|---|---|---|
| JP | 2014123443 | A | * | 7/2014 | .............. H01M 2/16 |
| WO | 2012/036025 | A1 | | 3/2012 | |

* cited by examiner

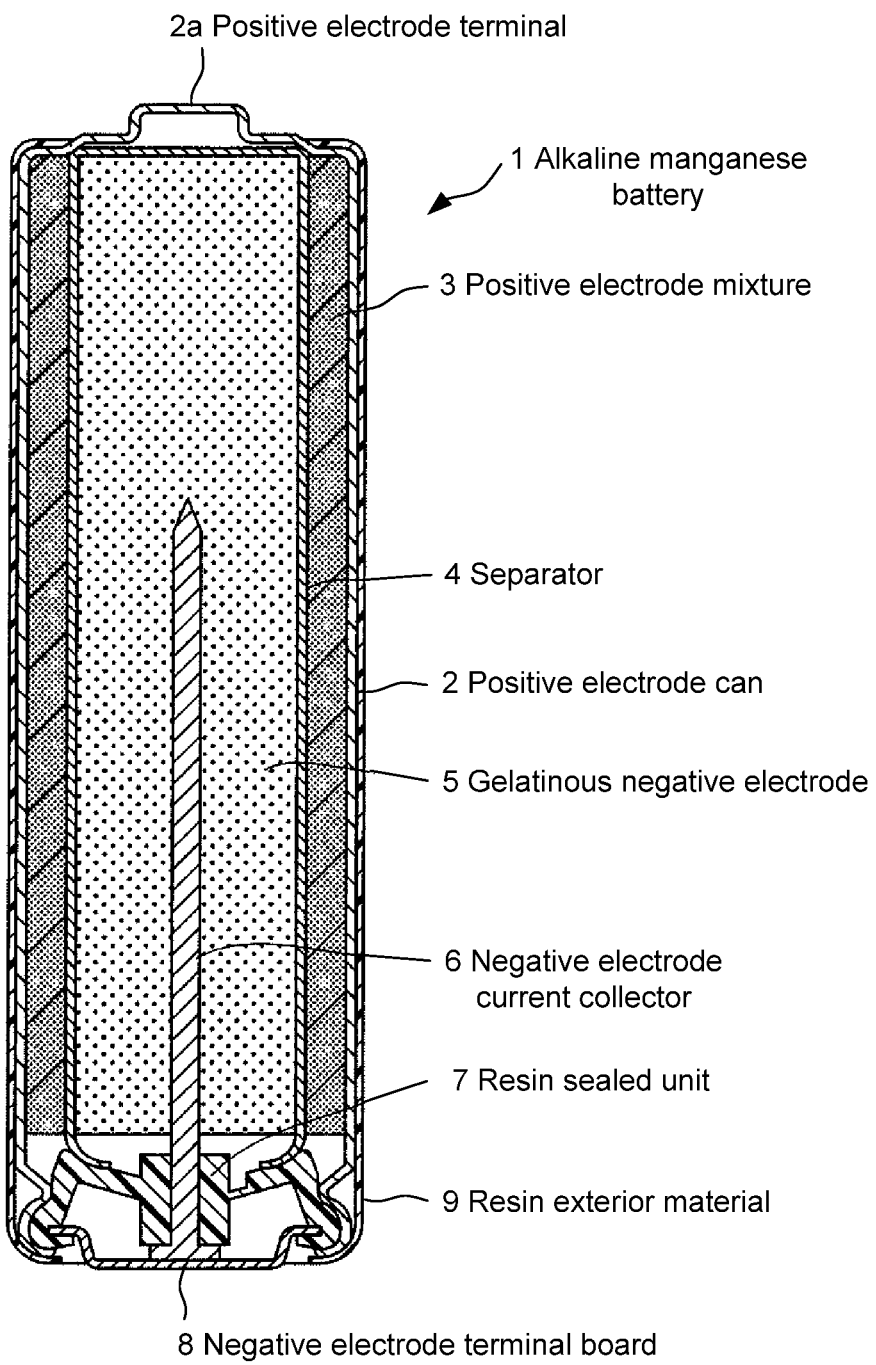

ALKALINE BATTERY SEPARATOR AND ALKALINE BATTERY

TECHNICAL FIELD

The present invention relates to an alkaline battery separator and an alkaline battery. More specifically, it relates to a separator used in various alkaline batteries, such as alkaline manganese batteries, silver oxide batteries, mercury batteries, zinc air batteries, and an alkaline battery using the separator.

BACKGROUND ART

Characteristics conventionally required of a separator for separating a positive electrode active material from an negative electrode active material in an alkaline battery include prevention of an internal short circuit due to contact between the positive electrode active material and the negative electrode active material or due to conductive metal oxide capillary crystals (dendrite), durability preventing shrinkage and deformation due to a positive active material, such as manganese dioxide, nickel oxyhydroxide or silver oxide, and/or due to an electrolytic solution such as potassium hydroxide, long time retaining of a sufficient amount of electrolytic solution to generate an electrogenic reaction, and no inhibition of ion conduction.

In manufacturing the separator, cellulose fibers that can be fibrillated, such as mercerized pulp, cotton linter pulp, polynosic fibers, or solvent spun cellulose fibers, are refined as needed so as to fibrillate the fibers and be used. The fibrillated cellulose fibers add denseness to the separator, thereby preventing generation of an internal short-circuit due to dendrite.

A separator for alkaline batteries that prevents an internal short-circuit when assembling a battery by controlling the average pore diameter of the separator is proposed as such a separator for alkaline batteries using the cellulose fibers that can be fibrillated in Patent Document 1 and Patent Document 2, for example.

Regenerated cellulose fibers called Lyocell (registered trademark) and Tencel (registered trademark) are well-known as some of the solvent spun cellulose fibers used in the separators described in Patent Document 1 and Patent Document 2, and a separator having excellent property of shielding between the positive and the negative electrode active material can be provided through fibrillation and blending of the fibers in the same manner as alkali-resistant cellulose pulp such as mercerized pulp or dissolved pulp.

PRIOR ART DOCUMENTS

Patent Documents

Patent Document 1: JP 2014-26877A
Patent Document 2: JP 2005-525675

DISCLOSURE OF THE INVENTION

Problem to be Solved by the Invention

There is a problem with the conventional separator for alkaline batteries that while the separator made by mixing synthetic fibers and cellulose fibers and then making paper from the mixed fibers has durability against electrolytic solution, positive electrode active material, and negative electrode active material, and an electrolytic solution retaining property, shielding property for preventing internal short-circuits due to contact of the positive electrode active material with the negative electrode active material and internal short-circuits due to dendrite is insufficient when the pore diameter of the separator is large.

As a countermeasure, there is a method of refining and blending cellulose fibers that can be fibrillated, or a method of blending synthetic fibers having a low linear density. Moreover, even when used as a separator, there is a method of laminating the separator in several layers so as to make the apparent pore diameter smaller, or a method of overlaying separator material having a small pore diameter, such as cellophane (registered trademark) films or polyethylene porous films.

Patent Document 1 and Patent Document 2 each propose a separator having excellent shielding property based on the average pore diameter of the separator, wherein these separators have a good balance of shielding property and liquid retention, and demonstrate favorable performance as separators. However, it is difficult to implement a separator having better shielding property that is recently in high demand while also having high liquid retention.

Means of Solving the Problem

The present invention aims to resolve the above problems, and includes the following structure, for example, as means for resolving the problems.

That is, a separator for an alkaline battery according to the present invention is characterized by comprising a wet nonwoven fabric which contains at least alkali-resistant cellulose fibers and alkali-resistant synthetic fibers, and is bound by a binder component; wherein an average pore diameter of the wet nonwoven fabric is 1 to 10 μm.

For example, it is characterized by having a maximum pore diameter of 20 to 60 μm, a liquid retention rate of the wet nonwoven fabric during immersion in a 40% by mass KOH solution is 400 to 700%, and a swelling ratio of the wet nonwoven fabric during immersion in a 40% by mass KOH solution is 30 to 45%. Moreover, for example, it is characterized by having a maximum pore diameter of the wet nonwoven fabric is 15 to 35 μm, a liquid retention rate of the wet nonwoven fabric during immersion in a 40% by mass KOH solution is 450 to 700%, and a swelling ratio of the wet nonwoven fabric during immersion in a 40% by mass KOH solution is 45 to 55%.

Furthermore, for example, it is characterized in that the alkali-resistant cellulose fibers include at least fibrillated solvent spun cellulose fibers and non-fibrillated cellulose. Further, for example, it is characterized in that the alkali-resistant synthetic fibers include at least polypropylene fibers. Yet further, for example, it is characterized in that the alkali-resistant synthetic fibers include at least non-acetalized polyvinyl alcohol fibers and acetalized polyvinyl alcohol fibers. Yet even further, for example, it is characterized in that the non-fibrillated cellulose includes at least regenerated cellulose fibers.

An alkaline battery according to the present invention is characterized in using the above-given separators for an alkaline battery as a separator.

Results of the Invention

According to the present invention, a separator for alkaline batteries and an alkaline battery improving reliability of prevention in internal short-circuits and having good liquid retention and shielding property may be provided.

BRIEF DESCRIPTION OF DRAWINGS

FIG. 1 is a central vertical cross-section of an alkaline battery using a separator for alkaline batteries according to the embodiments of the present invention.

DESCRIPTION OF EMBODIMENTS

Embodiments of the present invention are explained in detail with reference to a drawing. A first embodiment of the present invention is described to begin with.

First Embodiment

Typically, a separator has a higher shielding property the smaller the average pore diameter, improving reliability against short-circuits when assembling a battery. The inventors of the present invention have found that, as a result of repeating various tests and measuring in order to further improve the shielding property of the separator, the shielding property does not improve even if the average pore diameter is made smaller than a certain degree. This is due to the following reasons.

A wet nonwoven fabric is formed by dispersing a raw material in water and then dewatering (filtrating) the resulting water using a wire or the like so as to form sheets. Since pores generate in the wet nonwoven fabric due to fibers falling off etc. during dewatering, it is difficult to completely rid of pores in the manufacturing process of the wet nonwoven fabric. It is necessary to densely pack the fibers in the wet nonwoven fabric in order to reduce the average pore diameter. Therefore, an approach of orienting the fibers in the wet nonwoven fabric in the machine direction of a paper making machine so as to form aligned layers has been taken.

However, in order to manufacture a wet nonwoven fabric having fibers oriented in such an aligned manner, the speed of making paper when manufacturing needs to be increased. Consequently, dewatering ability as well as the paper making speed need to be increased, and the generated pores become larger due to the improved dewatering ability, wherein the shielding property of the separator is not improved as a result.

The inventors of the present invention, as described above, have found that even if the average pore diameter is controlled, there is a limit to how small the maximum pore diameter can be, that is, there is no correlation between control of the average pore diameter and control of the maximum pore diameter. In light of this result, a separator resolving the above problem is implemented by providing a configuration described below.

In other words, according to the first embodiment of the present invention, a separator satisfying liquid retention and swelling ratio that can improve the discharging characteristics and the shielding property that is capable of preventing internal short-circuits due to dendrite of metal oxides etc., may be provided. More specifically, a separator for alkaline batteries that is constituted by a wet nonwoven fabric made of alkali-resistant cellulose fibers, alkali-resistant synthetic fibers, and a binder component, and that has a maximum pore diameter of 20 to 60 μm, an average pore diameter of 1.0 to 10.0 μm, liquid retention rate of 400 to 700% during immersion in 40% by mass KOH, and a swelling ratio of 30 to 45% during immersion in 40% by mass KOH.

As described above, control of not only the average pore diameter but of the maximum pore diameter is also very important for improving the shielding property of the separator. The maximum pore diameter of the separator according to the first embodiment is 20.0 to 60.0 μm. If the maximum pore diameter exceeds 60.0 μm, it results in a separator with a low shielding property, and a short circuit thereby occurs when assembling a battery. Moreover, with a maximum pore diameter under 20 μm, the separator becomes too dense, and the resistance when assembling a battery may increase.

In this embodiment, the aspect ratio (MD/CD ratio) of tensile strength of the wet-type nonwoven fabric represented by the following Equation 1 is controlled so as to control the maximum pore diameter.

Aspect ratio=tensile strength in machine direction (MD) of nonwoven fabric/tensile strength in direction (CD) orthogonal to machine direction of nonwoven fabric    Equation 1

The aspect ratio of tensile strength is used in this embodiment as an indicator of the orientation of the nonwoven fabric. Typically, in the manufacturing process, it is easier to align fibers in the MD direction, and the tensile strength in the MD direction is stronger than tensile strength in the CD direction. As described above, if the fiber orientation is made stronger, the average pore diameter can be reduced, but the maximum pore diameter cannot be controlled.

In this embodiment, an aspect ratio of tensile strength within the range of 1.0 to 2.5 keeps the maximum pore diameter within the range of 20.0 to 60.0 μm. With an aspect ratio of tensile strength less than 1.0, deviation in bending rigidity in the MD direction of the separator may occur, and workability of the separator when manufacturing a battery may decrease. On the other hand, if the aspect ratio of tensile strength exceeds 2.5, the maximum pore diameter of the separator cannot be reduced, deviation in bending rigidity in the CD direction of the separator may occur, and workability of the separator when manufacturing a battery may decrease.

As such, the aspect ratio of tensile strength is not only an indicator of the maximum pore diameter of the separator, but also an important indicator of the affect on workability when used in a battery. Moreover, control of ratio (J/W ratio) of flow speed J (m/min) of raw material slurry to running speed W (m/min) of a paper-making wire can achieve the above-given aspect ratio of tensile strength.

Furthermore, the separator of this embodiment is characterized by having an average pore diameter of 10 μm or less. If the average pore diameter of the separator is greater than 10 μm, a sufficient shielding effect against growing dendrite cannot be achieved, nor can a sufficient shielding property to withstand intermittent discharge be achieved, and thus an average pore diameter of the separator is preferably 10 μm or less. On the other hand, with an average pore diameter of less than 1 μm, the separator may become too dense, and resistance when assembling a battery may increase.

A constituent material is important for such control of the average pore diameter. Now, raw material fibers used in paper making are described in detail below.

Regenerated cellulose fibers that can be fibrillated can be refined and divided into very fine fibrils having a diameter of 1 μm or less. In particular, the regenerated cellulose fibers that can be fibrillated have a high degree of crystallinity, and the internal structure of the fibers is made of cellulose crystalline parts and non-crystalline parts, wherein the crystalline parts are adhered together via the non-crystalline parts so as to form fibers.

When these fibers are refined, the non-crystalline parts are broken down, and the crystalline parts detach from the fibers, resulting in generation of fibrils having a diameter of 1 μm or less. The separator constituted by this fibrillated material has a very dense structure. Moreover, these fibrils are cellulose having an extremely high degree of crystallinity and therefore have high rigidity, the fibrils themselves are only slightly crushed flat and maintain a nearly circular cross-sectional shape even through being pressed in the paper making process, and the fibrils together make layers as a result of intertwining contact points and hydrogen bonding. However, the separator containing the fibrillated material has little redundancy in ion flow channels and thus has excellent ion permeability even while having a very dense paper quality.

The separator according to the embodiment is characterized by containing the fibrillated material of solvent spun cellulose fibers that can be fibrillated as a part of the alkali-resistant cellulose fibers. By applying shear force on the solvent spun cellulose fibers and processing (refining), the fibers are made finer, and a nonwoven fabric is formed from these refined fibers. This achieves a very dense sheet. The refined cellulose fibers are shorter than synthetic fibers and the like, and gaps in sheets are easier to fill, thereby improving shielding property of the separator.

A CSF value (ml) representing a degree of refining the solvent spun cellulose fibers gradually decreases to 0 ml when refined. If it is further refined even after the CSF value reaches 0 ml, the CSF value turns to rise.

The CSF value of the fibrillated solvent spun cellulose fibers used for the separator according to this embodiment is preferably 10 to 0 ml when it is decreasing as a result of refining, and 100 ml or less when it is rising. When the decreasing CSF value is greater than 10 ml, a sufficient denseness of the separator including the fibrillated material can no longer be achieved. On the other hand, when the CSF value having turned to rise exceeds 100 ml, the fibers become too fine, which is not suitable as a separator material for batteries.

While the fibrillated material content of the solvent spun cellulose fibers may be increased or decreased according to desired characteristics of the separator, the denseness of the separator that is the most distinctive feature of the fibrillated material tends to be lost with a content of less than 5% by mass, and the ion permeability of the separator due to excessive amount of the fibrillated material in the case of a content greater than 30% by mass tends to be lost. Therefore, in order to implement high levels of both shielding property and electrical characteristics, content within a range of 5 to 30% by mass is desired.

The denseness according to the fibrillated material mainly contributes to decrease in the average pore diameter, and improves shielding property of the separator. Other kinds of alkali-resistant cellulose fibers blended in addition to the fibrillated material of the solvent spun cellulose fibers include at least one type of non-fibrillated cellulose selected from non-fibrillated regenerated cellulose fibers, such as cuprammonium rayon and viscose rayon, and non-fibrillated cellulose pulp, such as mercerized pulp, cotton linter pulp and dissolving pulp; and the selected fibers together with the fibrillated material of the solvent spun cellulose fibers can be contained up to 30 to 70% by mass of the separator.

When the content of the alkali-resistant cellulose fibers is less than 30% by mass, the liquid retention rate of the separator decreases, and when the content exceeds 70% by mass, binding sites of hydrogen bond among the alkali-resistant cellulose fibers increase, denseness of the separator becomes too high, and the ion permeability is impaired.

Note that it has become clear in recent years that while refining even alkali-resistant cellulose pulp will generate fine fibrils in the same way as refining the solvent spun cellulose fibers, resulting in improvement in shielding property of the separator, it has a lower rigidity than the solvent spun cellulose fibers, and lowers the ion permeability of the separator more easily than the solvent spun cellulose fibers. Therefore, use of alkali-resistant cellulose pulp that is not fibrillated is preferred in this embodiment.

The 40% by mass KOH liquid retention rate of the separator for alkaline batteries according to the embodiment is preferably 400% or greater. There is a problem of degradation of high rate discharge characteristics if the liquid retention rate of the 40% by mass KOH aqueous solution is less than 400%. While the higher the liquid retention rate the better, there is an upper limit to the amount of electrolytic solution that can be effectively retained by the separator; wherein the upper limit may be approximately 700%. By making the alkali-resistant cellulose fiber content be 30 to 70% by mass, the liquid retention rate of the separator can be within the range of 400 to 700%.

Since the non-fibrillated regenerated cellulose fibers improve the liquid retention rate of the separator, they are particularly favorable among the above-given alkali-resistant cellulose fibers. While the content of the non-fibrillated regenerated cellulose fibers may be increased or decreased according to desired characteristics of the separator, the liquid retaining property of the separator that is the most distinctive feature of the non-fibrillated regenerated cellulose fibers tends to be lost with a content of less than 10% by mass. In the case where the content is greater than 40% by mass, swelling of the separator within the electrolytic solution tends to be too high due to excessive amount of the non-fibrillated regenerated cellulose fibers. Therefore, in order to implement high levels of liquid retention and swelling ratio, content within a range of 10 to 40% by mass is desired.

Use of polypropylene (referred to as PP hereafter) fibers as a part of the alkali-resistant synthetic fibers that are used for the wet nonwoven fabric constituting the separator of the embodiment is preferred. Comparing fiber shape, typically, acetalized polyvinyl alcohol fibers (referred to as vinylon fibers hereafter) used for the separator for alkaline batteries has a flat shape, while the PP fibers have a circular shape. Therefore, use of PP having a larger fiber diameter than the vinylon fibers allows a bulky separator, and control of denseness.

Moreover, when used as a separator for a battery, excessive infiltration of electrolytic solution to the separator can be suppressed as a result of hydrophobicity of the PP, thereby reducing the swelling ratio of the separator. As a result, when assembling a battery, it is possible to reduce the volume of the separator within the battery, increase filling amount of the cathode agent, and also achieve a high-capacity alkaline battery. These PP fibers may not necessarily be pure PP fibers, but may be modified PP fibers or conjugated fibers, such as PP/modified PP conjugated fibers or PP/polyethylene (referred to as PE hereafter) conjugated fibers.

While the content of PP fibers may be increased or decreased according to desired characteristics of the separator, suppression of the swelling ratio is difficult when the content is less than 5% by mass, and when the content is greater than 20% by mass, the hydrophobicity of the separator becomes stronger and the liquid retention rate is decreased.

The 40% by mass KOH swelling ratio of the separator for alkaline batteries according to the embodiment is preferably 30 to 45%. With a swelling ratio of less than 30%, the internal resistance when used in an alkaline battery increases. Moreover, if the swelling ratio exceeds 45%, the volume of the separator within a battery case is increased, thereby decreasing the filling amount of the cathode agent. There are cases where the 40% by mass KOH swelling ratio of the separator for alkaline batteries is set within a range of 30 to 45% through a realizing means of setting the content of PP fibers used as the alkali-resistant synthetic fibers within a range of 5 to 20% by mass.

Furthermore, other kinds of alkali-resistant synthetic fibers blended in addition to the PP fibers include at least one type selected from vinylon fibers, non-acetalized polyvinyl alcohol fibers (referred to as PVA fibers hereafter), polyamide fibers (referred to as PA fibers hereafter), PE fibers, PA/modified PA conjugated fibers, and PE synthetic pulp; and the selected fibers plus the PP fibers may be contained up to 20 to 50% by mass of the separator.

When the alkali-resistant synthetic fibers are less than 20% by mass, dimensional stability of the separator when impregnated in an alkaline electrolytic solution and thermal adhesiveness of a portion becoming the bottom when forming a cylinder are impaired, and when the fibers exceed 50% by mass, the denseness of the separator is lost, and internal short-circuits occur more easily. There is also a problem that the high rate discharge characteristic of the alkaline battery is degraded since the liquid retention of the separator is reduced.

The binder component has a content of 5 to 20% by mass, and thus the dimensional stability within the electrolytic solution is excellent, resulting in a dense separator having good ion permeability. The binder component often employs PVA binder fibers that dissolve in hot water of 60 to 90° C.

Note that 'alkali-resistant' of the alkali-resistant cellulose fibers and the alkali-resistant synthetic fibers of the embodiment indicates that decomposition of fibers due to alkaline electrolytic solution does not occur easily when used in an alkaline battery. More specifically, it indicates that a weight loss ratio after the fibers have been immersed in a 70° C., 40% by mass potassium hydroxide solution for eight hours is 10% or less.

A separator using fibers exceeding this weight loss ratio of 10% contains fibers that dissolve in the 40% by mass potassium hydroxide solution, wherein it gradually decomposes due to the electrolytic solution and generates gas once the battery is assembled. As an effect of this gas, the internal pressure of the battery rises, possibly leading to leakage.

Thickness of the separator for alkaline batteries of this embodiment is preferably 60 to 140 µm. If the thickness of the separator is less than 60 µm, the possibility of an internal short-circuit occurring increases since distance between the anode and the cathode becomes short, and the high rate discharge characteristic is degraded since retention of the alkaline electrolytic solution (of the separator) is insufficient. If the thickness of the separator exceeds 140 µm, the internal resistance of the battery increases since distance between the electrodes increases. Moreover, the occupied volume of the separator within the battery case increases, and since the amount of negative electrode active material impregnated into the battery decreases, the discharge capacity may decrease.

A manufacturing method of the separator for alkaline batteries of this embodiment is described next. Manufacturing the separator of this embodiment includes the following steps.

(1) Disperse in water the aforementioned solvent spun cellulose fibers that can be fibrillated, and refine them to a predetermined CSF value using a refining device for paper making, such as a beater or a refiner.

(2) Mix one or more types of the aforementioned non-fibrillated cellulose pulp to the refined fibers.

(3) Further mix in PP fibers and one or two types of the other alkali-resistant synthetic fibers as alkali-resistant synthetic fibers having excellent dimensional stability within an alkaline electrolytic solution.

(4) Fibers to be a binder component such as PVA binder fibers are then added and mixed to make a raw material.

(5) Make paper from this raw material using a cylindrical machine, a tanmo machine, an inclination type tanmo machine, a Fourdrinier machine, and/or a combination paper making machine made from a combination thereof. A wet nonwoven fabric may be monolayer or multi-layer. Even when it is multi-layer, multiple layers of the wet nonwoven fabric that is made into monolayer paper using not only a combination paper making machine, but also a cylindrical machine, a tanmo machine, an inclination type tanmo machine, or a Fourdrinier machine may be bound together.

Various combinations are possible for the layered combination such as two or three layers of the same paper formed by each of the paper making machines or a combination with layers formed by a different kind of paper making machine, as long as shielding property and liquid retention of the separator are not impaired.

The paper making method used by the inclination type tanmo machine and the Fourdrinier machine can freely control orientation of vertical and lateral fibers of the separator by reducing the flow speed of fiber slurry liquid sent on to a papermaking screen, and as a result, the vertical and lateral strength, bending rigidity, etc. of the separator can be adjusted, and a design taking processing of the separator into account when manufacturing a battery is possible.

DESCRIPTION OF WORKING EXAMPLES

Specific examples of a separator for alkaline batteries and an alkaline battery using the separator are described in detail below as working examples according to the first embodiment of the present invention. Note that the present invention and this embodiment are not limited to the descriptions of these working examples.

<Separator Testing Methods>

Measurements of separators of working examples, comparative examples, and a conventional example are measured by the following methods.

(1) Fiber Alkali Resistance Decomposition Test

Fibers are immersed in a 70° C., 40% by mass potassium hydroxide solution and left for eight hours. Weight when the fibers are cleaned in ion exchanged water and dried is then measured, and weight loss ratio is calculated as a decomposition rate (%) according to the following equation.

Decomposition rate (%)=(1−mass after decomposition/mass before decomposition)×100

(2) Canadian Standard Freeness (CSF)

CSF is measured in accordance with JIS P8121-2 'Pulps—Determination of drainability—Part 2: "Canadian Standard" freeness method.'

(3) Thickness

Thickness of two stacked separators is measured in several places at equal intervals using a G-type dial thickness gauge (measuring force: 2N, gauge head: φ10 mm), the measurements are halved as thickness of measured places for one separator, and an average of the measurements is taken as thickness (μm) of the separator.

(4) Basis Weight

Area and weight of the separator are measured so as to find the weight (g) per separator area (m²).

(5) Maximum Pore Diameter, Average Pore Diameter

Maximum pore diameter and average pore diameter are measured using methods stipulated in ASTM F316-03 and JIS K3832 and using the CFP-1200-AEXL-ESA manufactured by Porous Materials Inc.

Moreover, measurements are taken using GALWICK (manufactured by Porous Materials Inc.) as a test liquid.

(6) Aspect Ratio of Tensile Strength 15 mm×250 mm test specimens are aligned in the machine direction (MD) and in the cross direction (CD), they are pulled at a speed of approximately 200 mm per minute at holder intervals of 180 mm using an all-around tension tester or a tester conforming thereto, tensile strength is measured, and an aspect ratio (MD/CD ratio) is calculated using the following equation.

Aspect ratio=tensile strength in machine direction (MD)/tensile strength in cross direction (CD)

(7) Liquid Retention Rate

A separator is cut out in a 50 mm×50 mm square, weight after drying is measured, and then immersed in a 40% by mass KOH solution for ten minutes. This test specimen is attached as is on a glass plate slanted at a 45 degree angle and secured for three minutes, excess 40% by mass KOH solution is drained and removed, weight of the test specimen is measured, and a liquid retention rate (%) is calculated using the following equation.

Liquid retention rate (%)=(W2−W1)/W1×100

W1=weight before immersion
W2=weight after immersion (8) Swelling Ratio

As with measurement of thickness, two 500 mm-long separators without any creases in the cross direction (CD) are taken, rough surface sides of these test specimen separators are placed against each other and layered, and both ends are fixed so as not to move. It is then immersed in a 40% by mass KOH solution for 30 minutes, thickness is measured at five places in approximately equal intervals in a portion 15 mm or more inward from a paper end, an average is calculated, the average is divided by the number of the layers to find the thickness for one layer, and then swelling ratio is calculated using the following equation. Note that a G-type dial thickness gauge (measuring force: 2N, gauge head: φ10 mm) is used as a measuring device.

Swelling ratio (%)=(A2−A1)/A1×100

A1=average thickness before immersion
A2=average thickness after immersion (9) Ion resistance A separator is inserted between parallel platinum electrodes (platinum black-coated, disk-shaped electrodes having a 20 mm diameter) approximately 2 mm apart, which are immersed in a 40% by mass KOH solution, wherein increase in electrical resistance between the electrodes accompanying this insertion is set as ion resistance (mΩ) of the separator. Note that the electrical resistance between the electrodes is measured at a frequency of 1000 Hz using an LCR meter.

(10) Hydrogen Gas Generation Amount

A separator and KOH electrolytic solution (zinc oxide is added) are added to zinc alloy powder for commercially available alkaline manganese battery anodes and left at 70° C. for ten days, and generated amount of hydrogen gas (volume (μl) of generated hydrogen gas per gram of zinc) is measured. Note that zinc alloy powder, separator, and KOH electrolytic solution are prepared at a fixed weight ratio of 1:0.05:1, and then the amount of generated hydrogen gas is measured using a device similar to the device disclosed in FIG. 2 of JP 2008-171767A, for example, in measurement of each separator.

(11) Discharge Test

A. Manufacturing a battery

Thirty of an alkaline manganese battery (LR6) 1 constituted by a positive electrode can 2, a positive electrode mixture 3, a separator 4, a gelatinous negative electrode 5, a negative electrode current collector 6, a resin sealed unit 7, a negative electrode terminal board 8, and a resin exterior material 9 shown in FIG. 1 are manufactured using the separators of the working examples and comparative examples, respectively.

In the alkaline manganese battery 1 of FIG. 1, a positive electrode terminal 2a is formed on one end of the positive electrode can 2 having a bottom cylindrical form, and the positive electrode mixture 3 having a cylindrical form made of manganese dioxide and graphite is press fit in the cathode can 2. The separator 4 according to this embodiment is wound cylindrically, and the gelatinous negative electrode 5 made up of blended alkaline electrolytic solution and mercury-free zinc alloy powder is filled inside of the cylindrical separator 4.

Moreover, an opening part of the positive electrode can 2 is closed by the resin sealed unit 7, and the negative electrode terminal board 8 also acting as a negative electrode terminal is welded to a head part of the negative electrode current collector 6 in the resin sealed unit 7. The positive electrode terminal side of the separator wound cylindrically has a separator end part bonded or fused and sealed shut so as to prevent the cathode and the anode from touching. It is then wrapped by the resin exterior material 9 adhered to an outer surface of the positive electrode can 2 with the positive electrode terminal 2a and the negative electrode terminal board 8 exposed.

B. Discharge Test Method

A high-rate load discharge test for measuring the time (min.) until a final voltage of 0.9V at a load of 2Ω, and a light load discharge test for measuring the time (hours) until a final voltage of 0.9V at a load of 100Ω are conducted, and an average value (number of samples n is 10) of the results is calculated. In an intermittent discharge test, ten batteries are discharged at a load of 3.9Ω for five minutes a day, and batteries that have decreased to 0.9V or less within 50 days are counted as defective.

Table 1 shows test results of the fiber alkali resistance decomposition test.

TABLE 1

| | Alkali decomposition rate (%) |
|---|---|
| Solvent spun cellulose | 5.8 |
| Conifer dissolving pulp | 2.5 |
| Broad leaf tree dissolving pulp | 3.4 |
| Cotton linter | 2.1 |
| Mercerized conifer pulp | 4 |
| Mercerized broad leaf tree pulp | 4.4 |

TABLE 1-continued

| | Alkali decomposition rate (%) |
|---|---|
| PP | 0 |
| PP/PP | 0 |
| P/PE | 0 |
| Vinylon | 0 |
| PVA | 0 |
| PE | 0 |
| PA | 0 |
| PET | 100 |
| Conifer sulfite pulp | 15 |

As shown in Table 1, it can be seen that solvent spun cellulose fibers, conifer dissolving pulp, broad leaf tree dissolving pulp, cotton linter pulp, mercerized conifer pulp, and mercerized broad leaf tree pulp have low alkali decomposition rates, and are favorable as alkali-resistant cellulose fibers.

Moreover, polypropylene fibers (PP fibers), polyethylene fibers (PE fibers), PP/PP conjugated fibers, PP/PE conjugated fibers, acetalized polyvinyl alcohol fibers (vinylon fibers), non-acetalized polyvinyl alcohol fibers (PVA fibers), and polyamide fibers (PA fibers) have low alkali decomposition rates, and are favorable as alkali-resistant synthetic fibers.

In this embodiment, separators according to the following working examples, comparative examples and conventional example are manufactured using the alkali-resistant cellulose fibers and alkali-resistant synthetic fibers mentioned above.

Working Example 1

15% by mass solvent spun cellulose fibers (linear density: 1.7 dtex., fiber length: 4 mm) are refined until the CSF value reaches 5 ml. To this are mixed 30% by mass broad leaf tree dissolving pulp as alkali-resistant cellulose fibers, 10% by mass PP fibers (linear density: 3.3 dtex., fiber length: 5 mm), 20% by mass vinylon fibers (linear density: 1.1 dtex., fiber length: 3 mm), and 10% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 1.5 using an inclination type tanmo/cylindrical combination paper making machine so as to obtain a double layer separator having a thickness of 120.0 μm and a basis weight of 40.0 g/m². This separator has an aspect ratio of tensile strength of 1.6, a maximum pore diameter of 31.0 μm, an average pore diameter of 7.8 μm, a swelling ratio of 34%, a liquid retention rate of 432%, ion resistance of 13.3 mΩ, and gas generation amount of 90 μl/g. Moreover, 2Ω discharge time of an alkaline battery manufactured using this separator is 143 minutes, 100Ω discharge time is 245 hours, and the number of defective batteries is zero when intermittently discharged.

Working Example 2

5% by mass solvent spun cellulose fibers (linear density: 1.7 dtex., fiber length: 3 mm) are refined until the CSF value reaches 10 ml. To this are mixed 30% by mass viscose rayon fibers (linear density: 0.6 dtex., fiber length: 3 mm) and 10% by mass broad leaf tree dissolving pulp as alkali-resistant cellulose fibers, 10% by mass PP fibers (linear density: 0.8 dtex., fiber length: 5 mm), 5% by mass PP/modified PP conjugated fibers (linear density: 0.8 dtex., fiber length: 5 mm), 10% by mass vinylon fibers (linear density: 0.6 dtex., fiber length: 2 mm), and 20% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into paper having a J/W ratio of 1.9 using an inclination type tanmomachine so as to obtain a double layer separator having a thickness of 60.0 μm and a basis weight of 20.0 g/m². This separator has an aspect ratio of tensile strength of 2.0, a maximum pore diameter of 60.0 μm, an average pore diameter of 10.0 μm, a swelling ratio of 40%, a liquid retention rate of 608%, ion resistance of 14.0 mΩ, and gas generation amount of 96 μl/g. Moreover, 2Ω discharge time of an alkaline battery manufactured using this separator is 145 minutes, 100Ω discharge time is 239 hours, and the number of defective batteries is zero when intermittently discharged.

Working Example 3

30% by mass solvent spun cellulose fibers (linear density: 3.3 dtex., fiber length: 5 mm) are further refined even after the CSF value reaches 0 ml, and refining is continued until the CSF value that has turned to rise reaches 100 mL To this are mixed 15% by mass viscose rayon fibers (linear density: 3.3 dtex., fiber length: 4 mm) and 15% by mass broad leaf tree dissolving pulp as alkali-resistant cellulose fibers, 10% by mass PP fibers (linear density: 3.3 dtex., fiber length: 5 mm) and 20% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 1.9 using an inclination type tanmo/cylindrical combination paper making machine so as to obtain a double layer separator having a thickness of 140.0 μm and a basis weight of 45.0 g/m². This separator has an aspect ratio of tensile strength of 1.8, a maximum pore diameter of 25.0 μm, an average pore diameter of 1.1 μm, a swelling ratio of 43%, a liquid retention rate of 652%, ion resistance of 13.9 mΩ, and gas generation amount of 114 μl/g. Moreover, 2Ω discharge time of an alkaline battery manufactured using this separator is 155 minutes, 100Ω discharge time is 258 hours, and the number of defective batteries is zero when intermittently discharged.

Working Example 4

15% by mass solvent spun cellulose fibers (linear density: 1.7 dtex., fiber length: 4 mm) are refined until the CSF value reaches 5 ml. To this are mixed 30% by mass viscose rayon fibers (linear density: 1.1 dtex., fiber length: 3 mm) and 10% by mass broad leaf tree dissolving pulp as alkali-resistant cellulose fibers, 5% by mass PP fibers (linear density: 3.3 dtex., fiber length: 5 mm), 20% by mass vinylon fibers (linear density: 1.1 dtex., fiber length: 3 mm), and 10% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 1.4 using an inclination type tanmo/cylindrical combination paper making machine so as to obtain a double layer separator having a thickness of 100.0 μm and a basis weight of 30.0 g/m². This separator has an aspect ratio of tensile strength of 1.5, a maximum pore diameter of 32.0 μm, an average pore diameter of 4.6 μm, a swelling ratio of 42%, a liquid retention rate of 621%, ion resistance of 13.5 mΩ, and gas generation amount of 110 μl/g. Moreover, 2Ω discharge time of an alkaline battery manufactured using this separator is 141 minutes connected, 100Ω discharge time is 244 hours, and the number of defective batteries is zero when intermittently discharged.

Working Example 5

25% by mass solvent spun cellulose fibers (linear density: 1.7 dtex., fiber length: 4 mm) are further refined even after the CSF value reaches 0 ml, and refining is continued until the CSF value that has turned to rise reaches 50 ml. To this are mixed 10% by mass viscose rayon fibers (linear density: 0.8 dtex., fiber length: 3 mm) and 10% by mass conifer dissolving pulp as alkali-resistant cellulose fibers, 20% by mass PP fibers (linear density: 0.8 dtex., fiber length: 5 mm), 10% by mass vinylon fibers (linear density: 1.1 dtex., fiber length: 3 mm), and 10% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 1.6 using an inclination type tanmo/cylindrical combination paper making machine so as to obtain a double layer separator having a thickness of 80.0 μm and a basis weight of 23.0 g/m². This separator has an aspect ratio of tensile strength of 1.5, a maximum pore diameter of 31.0 μm, an average pore diameter of 9.1 μm, a swelling ratio of 38%, a liquid retention rate of 478%, ion resistance of 11.5 mΩ, and gas generation amount of 101 μl/g. Moreover, 2Ω discharge time of an alkaline battery manufactured using this separator is 141 minutes, 100Ω discharge time is 240 hours, and the number of defective batteries is zero when intermittently discharged.

Working Example 6

10% by mass solvent spun cellulose fibers (linear density: 1.7 dtex., fiber length: 2 mm) are refined until the CSF value reaches 1 ml. To this are mixed 10% by mass viscose rayon fibers (linear density: 0.8 dtex., fiber length: 3 mm) and 20% by mass broad leaf tree dissolving pulp as alkali-resistant cellulose fibers, 10% by mass PP fibers (linear density: 3.3 dtex., fiber length: 5 mm), 20% by mass vinylon fibers (linear density: 1.1 dtex., fiber length: 3 mm), and 15% by mass PE fibers (linear density: 3.3 dtex., fiber length: 5 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 2.1 using a Fourdrinier/cylindrical combination paper making machine so as to obtain a double layer separator having a thickness of 95.0 μm and a basis weight of 30.0 g/m². This separator has an aspect ratio of tensile strength of 2.4, a maximum pore diameter of 54.0 μm, an average pore diameter of 8.3 μm, a swelling ratio of 40%, a liquid retention rate of 597%, ion resistance of 12.4 mΩ, and gas generation amount of 94 μl/g. Moreover, 2Ω discharge time of an alkaline battery manufactured using this separator is 149 minutes, 100Ω discharge time is 238 hours, and the number of defective batteries is zero when intermittently discharged.

Working Example 7

15% by mass solvent spun cellulose fibers (linear density: 1.7 dtex., fiber length: 5 mm) are refined until the CSF value reaches 3 ml. To this are mixed 40% by mass viscose rayon fibers (linear density: 1.7 dtex., fiber length: 3 mm) and 10% by mass mercerized broad leaf tree pulp as alkali-resistant cellulose fibers, 10% by mass PP fibers (linear density: 3.3 dtex., fiber length: 5 mm), 10% by mass vinylon fibers (linear density: 0.6 dtex., fiber length: 3 mm), and 5% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 0.7 using an inclination type tanmo/cylindrical combination paper making machine so as to obtain a double layer separator having a thickness of 120.0 μm and a basis weight of 40.0 g/m². This separator has an aspect ratio of tensile strength of 1.6, a maximum pore diameter of 49.0 μm, an average pore diameter of 5.4 μm, a swelling ratio of 45%, a liquid retention rate of 684%, ion resistance of 12.8 mΩ, and gas generation amount of 119 μl/g. Moreover, 2Ω discharge time of an alkaline battery manufactured using this separator is 142 minutes, 100Ω discharge time is 241 hours, and the number of defective batteries is zero when intermittently discharged.

Working Example 8

10% by mass solvent spun cellulose fibers (linear density: 1.7 dtex., fiber length: 5 mm) are refined until the CSF value reaches 3 ml. To this are mixed 20% by mass mercerized broad leaf tree pulp as alkali-resistant cellulose fibers, 10% by mass PP fibers (linear density: 0.8 dtex., fiber length: 5 mm), 5% by mass PP/modified PP conjugated fibers (linear density: 0.8 dtex., fiber length: 5 mm), 15% by mass vinylon fibers (linear density: 1.1 dtex., fiber length: 3 mm), and 20% by mass PVA fibers (linear density: 1.1 dtex., fiber length: 2 mm) as alkali-resistant synthetic fibers, and 20% by mass PVA binder fibers (linear density: 1.1 dtex., fiber length: 3 mm) as a binder component.

This mixed raw material is made into layered paper having a J/W ratio of 1.8 using an inclination type tanmo/cylindrical combination paper making machine so as to obtain a double layer separator having a thickness of 80.0 μm and a basis weight of 25.0 g/m². This separator has an aspect ratio of tensile strength of 1.7, a maximum pore diameter of 45.0 μm, an average pore diameter of 6.4 μm, a swelling ratio of 30%, a liquid retention rate of 400%, ion resistance of 13.9 mΩ, and gas generation amount of 94 μl/g. Moreover, 2Ω discharge time of an alkaline battery manufactured using this separator is 156 minutes, 100Ω discharge time is 248 hours, and the number of defective batteries is zero when intermittently discharged.

Working Example 9

20% by mass solvent spun cellulose fibers (linear density: 1.7 dtex., fiber length: 4 mm) are further refined even after the CSF value reaches 0 ml, and refining is continued until the CSF value that has turned to rise reaches 30 ml. To this are mixed 25% by mass viscose rayon fibers (linear density: 0.6 dtex., fiber length: 3 mm) and 25% by mass cotton linter pulp as alkali-resistant cellulose fibers, 10% by mass PP fibers (linear density: 0.8 dtex., fiber length: 5 mm) and 10% by mass vinylon fibers (linear density: 0.6 dtex., fiber length: 2 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 1.2 using an inclination type tanmo/cylindrical combination paper making machine so as to obtain a double layer separator having a thickness of 74.0 µm and a basis weight of 24.0 g/m². This separator has an aspect ratio of tensile strength of 1.4, a maximum pore diameter of 35.0 µm, an average pore diameter of 4.4 µm, a swelling ratio of 44%, a liquid retention rate of 700%, ion resistance of 12.6 mΩ, and gas generation amount of 122 µl/g. Moreover, 2Ω discharge time of an alkaline battery manufactured using this separator is 149 minutes, 100Ω discharge time is 246 hours, and the number of defective batteries is zero when intermittently discharged.

Working Example 10

15% by mass solvent spun cellulose fibers (linear density: 3.3 dtex., fiber length: 4 mm) are refined until the CSF value reaches 0 ml. To this are mixed 15% by mass viscose rayon fibers (linear density: 1.7 dtex., fiber length: 3 mm) and 10% by mass broad leaf tree dissolving pulp as alkali-resistant cellulose fibers, 5% by mass PP fibers (linear density: 0.8 dtex., fiber length: 5 mm), 5% by mass PP/modified PE conjugated fibers (linear density: 0.8 dtex., fiber length: 5 mm), 20% by mass vinylon fibers (linear density: 1.1 dtex., fiber length: 3 mm), and 20% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 0.5 using a cylindrical/inclination type tanmo/cylindrical combination paper making machine so as to obtain a triple layer separator having a thickness of 133.0 µm and a basis weight of 39.0 g/m². This separator has an aspect ratio of tensile strength of 2.2, a maximum pore diameter of 52.0 µm, an average pore diameter of 7.7 µm, a swelling ratio of 37%, a liquid retention rate of 469%, ion resistance of 10.9 mΩ, and gas generation amount of 91 µl/g. Moreover, 2Ω discharge time of an alkaline battery manufactured using this separator is 137 minutes, 100Ω discharge time is 238 hours, and the number of defective batteries is zero when intermittently discharged.

Working Example 11

15% by mass solvent spun cellulose fibers (linear density: 1.7 dtex., fiber length: 4 mm) are further refined even after the CSF value reaches 0 ml, and refining is continued until the CSF value that has turned to rise reaches 50 ml. To this are mixed 25% by mass broad leaf tree dissolving pulp and 25% by mass cotton linter pulp as alkali-resistant cellulose fibers, 10% by mass PP/modified PP conjugated fibers (linear density: 2.2 dtex., fiber length: 5 mm) and 10% by mass vinylon fibers (linear density: 1.1 dtex., fiber length: 3 mm) as alkali-resistant synthetic fibers, and 15% by mass PVA binder fibers (linear density: 1.1 dtex., fiber length: 3 mm) as a binder component.

This mixed raw material is made into paper having a J/W ratio of 1.1 using an inclination type tanmomachine so as to obtain a separator having a thickness of 125.0 µm and a basis weight of 39.0 g/m². This separator has an aspect ratio of tensile strength of 1.0, a maximum pore diameter of 39.0 µm, an average pore diameter of 2.6 µm, a swelling ratio of 38%, a liquid retention rate of 475%, ion resistance of 13.1 mΩ, and gas generation amount of 89 µl/g. Moreover, 2Ω discharge time of an alkaline battery manufactured using this separator is 144 minutes, 100Ω discharge time is 239 hours, and the number of defective batteries is zero when intermittently discharged.

Working Example 12

10% by mass solvent spun cellulose fibers (linear density: 1.7 dtex., fiber length: 4 mm) are refined until the CSF value reaches 0 ml. To this are mixed 20% by mass broad leaf tree dissolving pulp and 20% by mass mercerized conifer pulp as alkali-resistant cellulose fibers, 15% by mass PP fibers (linear density: 0.8 dtex., fiber length: 5 mm), 10% by mass vinylon fibers (linear density: 0.6 dtex., fiber length: 2 mm), 10% by mass PVA fibers (linear density: 1.1 dtex., fiber length: 2 mm), and 10% by mass PA fibers as alkali-resistant synthetic fibers, and 5% by mass PVA binder fibers (linear density: 1.1 dtex., fiber length: 3 mm) as a binder component.

This mixed raw material is made into layered paper having a J/W ratio of 1.3 using an inclination type tanmo/cylindrical combination paper making machine so as to obtain a double layer separator having a thickness of 95.0 µm and a basis weight of 26.0 g/m². This separator has an aspect ratio of tensile strength of 1.4, a maximum pore diameter of 30.0 µm, an average pore diameter of 4.3 µm, a swelling ratio of 35%, a liquid retention rate of 453%, ion resistance of 11.6 mΩ, and gas generation amount of 91 µl/g. Moreover, 2Ω discharge time of an alkaline battery manufactured using this separator is 141 minutes, 100Ω discharge time is 237 hours, and the number of defective batteries is zero when intermittently discharged.

Working Example 13

20% by mass solvent spun cellulose fibers (linear density: 1.7 dtex., fiber length: 4 mm) are refined until the CSF value reaches 5 ml. To this are mixed 25% by mass broad leaf tree dissolving pulp as alkali-resistant cellulose fibers, 10% by mass PP fibers (linear density: 0.8 dtex., fiber length: 5 mm), 20% by mass vinylon fibers (linear density: 1.1 dtex., fiber length: 3 mm), and 10% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 0.9 using an inclination type tanmo/inclination type tanmo combination paper making machine so as to obtain a double layer separator having a thickness of 100.0 µm and a basis weight of 30.0 g/m². This separator has an aspect ratio of tensile strength of 1.0, a maximum pore diameter of 23.0 µm, an average pore diameter of 3.0 µm, a swelling ratio of 33%, a liquid retention rate of 434%, ion resistance of 13.5 mΩ, and gas generation amount of 87 µl/g. Moreover, 2Ω discharge time of an alkaline battery manufactured using this separator is 140 minutes, 100Ω discharge time is 244 hours, and the number of defective batteries is zero when intermittently discharged.

Working Example 14

25% by mass solvent spun cellulose fibers (linear density: 1.7 dtex., fiber length: 4 mm) are refined until the CSF value reaches 5 ml. To this are mixed 20% by mass broad leaf tree dissolving pulp as alkali-resistant cellulose fibers, 10% by mass PP fibers (linear density: 3.3 dtex., fiber length: 5 mm), 20% vinylon fibers (linear density: 1.1 dtex., fiber length: 2 mm), and 10% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 2.1 using a cylindrical/inclination type tanmo/cylindrical combination paper making machine so as to obtain a triple layer separator having a thickness of 100.0 μm and a basis weight of 30.0 g/m². This separator has an aspect ratio of tensile strength of 2.5, a maximum pore diameter of 47.0 μm, an average pore diameter of 9.8 μm, a swelling ratio of 34%, a liquid retention rate of 448%, ion resistance of 10.9 mΩ, and gas generation amount of 91 μl/g. Moreover, 2Ω discharge time of an alkaline battery manufactured using this separator is 139 minutes, 100Ω discharge time is 242 hours, and the number of defective batteries is zero when intermittently discharged.

Working Example 15

15% by mass solvent spun cellulose fibers (linear density: 1.7 dtex., fiber length: 4 mm) are refined until the CSF value reaches 5 ml. To this are mixed 30% by mass broad leaf tree dissolving pulp as alkali-resistant cellulose fibers, 10% by mass PP fibers (linear density: 0.8 dtex., fiber length: 5 mm), 20% vinylon fibers (linear density: 1.1 dtex., fiber length: 3 mm), and 10% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 1.2 using a Fourdrinier/tanmo machine so as to obtain a double layer separator having a thickness of 100.0 μm and a basis weight of 30.0 g/m². This separator has an aspect ratio of tensile strength of 1.4, a maximum pore diameter of 20.0 μm, an average pore diameter of 1.2 μm, a swelling ratio of 33%, a liquid retention rate of 431%, ion resistance of 13.2 mΩ, and gas generation amount of 88 μl/g. Moreover, 2Ω discharge time of an alkaline battery manufactured using this separator is 147 minutes, 100Ω discharge time is 246 hours, and the number of defective batteries is zero when intermittently discharged.

Working Example 16

15% by mass solvent spun cellulose fibers (linear density: 1.7 dtex., fiber length: 4 mm) are refined until the CSF value reaches 0 ml. To this are mixed 20% by mass viscose rayon fibers (linear density: 1.1 dtex., fiber length: 3 mm) and 15% by mass broad leaf tree dissolving pulp as alkali-resistant cellulose fibers, 10% by mass PP fibers (linear density: 0.8 dtex., fiber length: 5 mm), 15% by mass vinylon fibers (linear density: 1.1 dtex., fiber length: 3 mm), and 15% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 1.6 using an inclination type tanmo/cylindrical combination paper making machine so as to obtain a double layer separator having a thickness of 138.0 μm and a basis weight of 42.0 g/m². This separator has an aspect ratio of tensile strength of 1.8, a maximum pore diameter of 40.0 μm, an average pore diameter of 5.4 μm, a swelling ratio of 40%, a liquid retention rate of 601%, ion resistance of 13.2 mΩ, and gas generation amount of 104 μl/g. Moreover, 2Ω discharge time of an alkaline battery manufactured using this separator is 143 minutes, 100Ω discharge time is 240 hours, and the number of defective batteries is zero when intermittently discharged.

Comparative Example 1

35% by mass solvent spun cellulose fibers (linear density: 1.7 dtex., fiber length: 4 mm) are refined until the CSF value reaches 10 ml. To this are mixed 5% by mass broad leaf tree dissolving pulp as alkali-resistant cellulose fibers, 15% by mass PP fibers (linear density: 3.3 dtex., fiber length: 5 mm), 15% vinylon fibers (linear density: 1.1 dtex., fiber length: 3 mm), and 15% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 0.7 using an inclination type tanmo/cylindrical combination paper making machine so as to obtain a double layer separator having a thickness of 118.0 μm and a basis weight of 38.0 g/m². This separator has an aspect ratio of tensile strength of 1.7, a maximum pore diameter of 18.0 μm, an average pore diameter of 2.2 μm, a swelling ratio of 38%, a liquid retention rate of 476%, ion resistance of 25.0 mΩ, and gas generation amount of 99 μl/g. Moreover, 2Ω discharge time of an alkaline battery manufactured using this separator is 109 minutes, 100Ω discharge time is 194 hours, and the number of defective batteries is zero when intermittently discharged.

Comparative Example 2

2% by mass solvent spun cellulose fibers (linear density: 1.7 dtex., fiber length: 4 mm) are further refined even after the CSF value reaches 0 ml, and refining is continued until the CSF value that has turned to rise reaches 100 ml. To this are mixed 28% by mass broad leaf tree dissolving pulp as alkali-resistant cellulose fibers, 10% by mass PP fibers (linear density: 3.3 dtex., fiber length: 5 mm), 20% vinylon fibers (linear density: 1.1 dtex., fiber length: 3 mm), and 20% by mass PVA fibers (linear density: 1.1 dtex., fiber length: 2 mm) as alkali-resistant synthetic fibers, and 20% by mass PVA binder fibers (linear density: 1.1 dtex., fiber length: 3 mm) as a binder component.

This mixed raw material is made into layered paper having a J/W ratio of 1.7 using a Fourdrinier/tanmo machine so as to obtain a double layer separator having a thickness of 58.0 μm and a basis weight of 18.0 g/m². This separator has an aspect ratio of tensile strength of 1.9, a maximum pore diameter of 65.0 μm, an average pore diameter of 12 μm, a swelling ratio of 32%, a liquid retention rate of 418%, ion resistance of 17.0 mΩ, and gas generation amount of 98 μl/g. Moreover, 2Ω discharge time of an alkaline battery manufactured using this separator is 135 minutes, 100Ω discharge time is 213 hours, and the number of defective batteries is seven when intermittently discharged.

Comparative Example 3

25% by mass solvent spun cellulose fibers (linear density: 1.7 dtex., fiber length: 4 mm) are refined until the CSF value reaches 5 ml. To this are mixed 30% by mass viscose rayon fibers (linear density: 1.1 dtex., fiber length: 3 mm) and 20% by mass broad leaf tree dissolving pulp as alkali-resistant cellulose fibers, 10% by mass PP fibers (linear density: 3.3 dtex., fiber length: 5 mm) and 10% by mass vinylon fibers (linear density: 1.1 dtex., fiber length: 3 mm) as alkali-resistant synthetic fibers, and 5% by mass PVA binder fibers (linear density: 1.1 dtex., fiber length: 3 mm) as a binder component.

This mixed raw material is made into layered paper having a J/W ratio of 1.5 using an inclination type tanmo/cylindrical combination paper making machine so as to obtain a double layer separator having a thickness of 138.0 µm and a basis weight of 41.0 g/m². This separator has an aspect ratio of tensile strength of 1.6, a maximum pore diameter of 49.0 µm, an average pore diameter of 8.3 µm, a swelling ratio of 55%, a liquid retention rate of 697%, ion resistance of 10.8 mΩ, and gas generation amount of 141 µl/g. Moreover, 2Ω discharge time of an alkaline battery manufactured using this separator is 118 minutes, 100Ω discharge time is 207 hours, and the number of defective batteries is three when intermittently discharged.

Comparative Example 4

15% by mass solvent spun cellulose fibers (linear density: 1.7 dtex., fiber length: 4 mm) are refined until the CSF value reaches 0 ml. To this are mixed 10% by mass broad leaf tree dissolving pulp as alkali-resistant cellulose fibers, 15% by mass PP fibers (linear density: 3.3 dtex., fiber length: 5 mm), 20% by mass vinylon fibers (linear density: 1.1 dtex., fiber length: 3 mm), and 20% by mass PVA fibers (linear density: 1.1 dtex., fiber length: 2 mm) as alkali-resistant synthetic fibers, and 20% by mass PVA binder fibers (linear density: 1.1 dtex., fiber length: 3 mm) as a binder component.

This mixed raw material is made into layered paper having a J/W ratio of 1.6 using an inclination type tanmo/cylindrical combination paper making machine so as to obtain a double layer separator having a thickness of 97.0 µm and a basis weight of 32.0 g/m². This separator has an aspect ratio of tensile strength of 1.6, a maximum pore diameter of 45.0 µm, an average pore diameter of 8.0 µm, a swelling ratio of 28%, a liquid retention rate of 377%, ion resistance of 12.2 mΩ, and gas generation amount of 94 µl/g. Moreover, 2Ω discharge time of an alkaline battery manufactured using this separator is 103 minutes, 100Ω discharge time is 201 hours, and the number of defective batteries is zero when intermittently discharged.

Comparative Example 5

15% by mass solvent spun cellulose fibers (linear density: 1.7 dtex., fiber length: 4 mm) are refined until the CSF value reaches 2 ml. To this are mixed 20% by mass viscose rayon fibers (linear density: 1.1 dtex., fiber length: 3 mm) and 20% by mass broad leaf tree dissolving pulp as alkali-resistant cellulose fibers, 3% by mass PP fibers (linear density: 3.3 dtex., fiber length: 5 mm), 17% by mass vinylon fibers (linear density: 1.1 dtex., fiber length: 3 mm), and 15% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 0.8 using an inclination type tanmo/cylindrical combination paper making machine so as to obtain a double layer separator having a thickness of 104.0 µm and a basis weight of 35.0 g/m². This separator has an aspect ratio of tensile strength of 1.5, a maximum pore diameter of 61.0 µm, an average pore diameter of 11.4 µm, a swelling ratio of 46%, a liquid retention rate of 612%, ion resistance of 11.3 mΩ, and gas generation amount of 93 µl/g. Moreover, 2Ω discharge time of an alkaline battery manufactured using this separator is 108 minutes, 100Ω discharge time is 196 hours, and the number of defective batteries is five when intermittently discharged.

Comparative Example 6

15% by mass solvent spun cellulose fibers (linear density: 1.7 dtex., fiber length: 4 mm) are refined until the CSF value reaches 2 ml. To this are mixed 25% by mass viscose rayon fibers (linear density: 1.1 dtex., fiber length: 3 mm) as alkali-resistant cellulose fibers, 25% by mass PP fibers (linear density: 3.3 dtex., fiber length: 5 mm), 15% by mass vinylon fibers (linear density: 1.1 dtex., fiber length: 3 mm), and 10% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into paper having a J/W ratio of 2.0 using an inclination type tanmo machine so as to obtain a separator having a thickness of 100.0 µm and a basis weight of 25.0 g/m². This separator has an aspect ratio of tensile strength of 2.2, a maximum pore diameter of 47.0 µm, an average pore diameter of 7.7 µm, a swelling ratio of 31%, a liquid retention rate of 390%, ion resistance of 13.1 mΩ, and gas generation amount of 109 µl/g. Moreover, 2Ω discharge time of an alkaline battery manufactured using this separator is 126 minutes, 100Ω discharge time is 222 hours, and the number of defective batteries is zero when intermittently discharged.

Comparative Example 7

15% by mass solvent spun cellulose fibers (linear density: 1.7 dtex., fiber length: 4 mm) are refined until the CSF value reaches 0 ml. To this are mixed 20% by mass conifer dissolving pulp, 20% by mass broad leaf tree dissolving pulp, and 10% by mass mercerized conifer pulp as alkali-resistant cellulose fibers, 15% by mass PP fibers (linear density: 3.3 dtex., fiber length: 5 mm) as alkali-resistant synthetic fibers, and 20% by mass PVA binder fibers (linear density: 1.1 dtex., fiber length: 3 mm) as a binder component.

This mixed raw material is made into layered paper having a J/W ratio of 0.8 using an inclination type tanmo/cylindrical combination paper making machine so as to obtain a double layer separator having a thickness of 100.0 µm and a basis weight of 30.0 g/m². This separator has an aspect ratio of tensile strength of 1.6, a maximum pore diameter of 28.0 µm, an average pore diameter of 7.7 µm, a swelling ratio of 39%, a liquid retention rate of 496%, ion resistance of 14.8 mΩ, and gas generation amount of 136 µl/g. While manufacturing an alkaline battery using this separator has been attempted, a discharge test is not conducted since a blending ratio of the alkali-resistant synthetic fibers is low, and welding is impossible when forming a part to become a bottom through heat welding.

Comparative Example 8

15% by mass solvent spun cellulose fibers (linear density: 1.7 dtex., fiber length: 4 mm) are refined until the CSF value reaches 3 ml. To this are mixed 35% by mass broad leaf tree dissolving pulp as alkali-resistant cellulose fibers, 7% by mass PP fibers (linear density: 3.3 dtex., fiber length: 5 mm), 20% by mass vinylon fibers (linear density: 1.1 dtex., fiber length: 3 mm), and 20% by mass PVA fibers (linear density: 1.1 dtex., fiber length: 2 mm) as alkali-resistant synthetic fibers, and 3% by mass PVA binder fibers (linear density: 1.1 dtex., fiber length: 3 mm) as a binder component.

This mixed raw material is made into paper having a J/W ratio of 1.0 using an inclination type tanmo machine so as to obtain a separator having a thickness of 127.0 μm and a basis weight of 40.0 g/m². This separator has an aspect ratio of tensile strength of 1.2, a maximum pore diameter of 39.0 μm, an average pore diameter of 8.3 μm, a swelling ratio of 41%, a liquid retention rate of 511%, ion resistance of 11.5 mΩ, and gas generation amount of 90 μl/g. While manufacturing an alkaline battery using this separator has been attempted, a discharge test is not conducted since a blending ratio of the PVA binder fibers as a binder component is low, resulting in a weak separator strength and breakage of the separator.

Comparative Example 9

15% by mass solvent spun cellulose fibers (linear density: 1.7 dtex., fiber length: 4 mm) are refined until the CSF value reaches 3 ml. To this are mixed 20% by mass broad leaf tree dissolving pulp as alkali-resistant cellulose fibers, 10% by mass PP fibers (linear density: 3.3 dtex., fiber length: 5 mm), 15% by mass vinylon fibers (linear density: 1.1 dtex., fiber length: 3 mm), and 15% by mass PVA fibers (linear density: 1.1 dtex., fiber length: 2 mm) as alkali-resistant synthetic fibers, and 25% by mass PVA binder fibers (linear density: 1.1 dtex., fiber length: 3 mm) as a binder component.

This mixed raw material is made into layered paper having a J/W ratio of 1.6 using an inclination type tanmo/cylindrical combination paper making machine so as to obtain a double layer separator having a thickness of 94.0 μm and a basis weight of 27.0 g/m². This separator has an aspect ratio of tensile strength of 1.5, a maximum pore diameter of 30.0 μm, an average pore diameter of 6.3 μm, a swelling ratio of 27%, a liquid retention rate of 388%, ion resistance of 12.4 mΩ, and gas generation amount of 91 μl/g. Moreover, 2Ω discharge time of an alkaline battery manufactured using this separator is 105 minutes, 100Ω discharge time is 207 hours, and the number of defective batteries is zero when intermittently discharged.

Comparative Example 10

10% by mass solvent spun cellulose fibers (linear density: 1.7 dtex., fiber length: 4 mm) are refined until the CSF value reaches 3 ml. To this are mixed 50% by mass viscose rayon fibers (linear density: 1.1 dtex., fiber length: 3 mm) as alkali-resistant cellulose fibers, 10% by mass PP fibers (linear density: 3.3 dtex., fiber length: 5 mm) and 20% by mass vinylon fibers (linear density: 1.1 dtex., fiber length: 3 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 1.6 using an inclination type tanmo/cylindrical combination paper making machine so as to obtain a double layer separator having a thickness of 120.0 μm and a basis weight of 38.0 g/m². This separator has an aspect ratio of tensile strength of 1.7, a maximum pore diameter of 51.0 μm, an average pore diameter of 9.6 μm, a swelling ratio of 62%, a liquid retention rate of 744%, ion resistance of 12.4 mΩ, and gas generation amount of 114 μl/g. Moreover, 2Ω discharge time of an alkaline battery manufactured using this separator is 120 minutes, 100Ω discharge time is 220 hours, and the number of defective batteries is zero when intermittently discharged.

Comparative Example 11

15% by mass solvent spun cellulose fibers (linear density: 1.7 dtex., fiber length: 4 mm) are refined until the CSF value reaches 5 ml. To this are mixed 30% by mass viscose rayon fibers (linear density: 1.1 dtex., fiber length: 3 mm) and 10% by mass broad leaf tree dissolving pulp as alkali-resistant cellulose fibers, 5% by mass PP fibers (linear density: 3.3 dtex., fiber length: 5 mm), 20% by mass vinylon fibers (linear density: 1.1 dtex., fiber length: 3 mm), and 10% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into paper having a J/W ratio of 1.0 using an inclination type tanmo machine so as to obtain a separator having a thickness of 105.0 μm and a basis weight of 31.0 g/m². This separator has an aspect ratio of tensile strength of 0.7, a maximum pore diameter of 19.0 μm, an average pore diameter of 2.6 μm, a swelling ratio of 39%, a liquid retention rate of 593%, ion resistance of 13.5 mΩ, and gas generation amount of 110 μl/g. While manufacturing an alkaline battery using this separator has been attempted, a discharge test is not conducted since there is no resilience due to too small an MD/CD ratio and a defect occurs at the time of cylinder formation.

Comparative Example 12

15% by mass solvent spun cellulose fibers (linear density: 1.7 dtex., fiber length: 4 mm) are refined until the CSF value reaches 5 ml. To this are mixed 30% by mass viscose rayon fibers (linear density: 1.1 dtex., fiber length: 3 mm) and 10% by mass broad leaf tree dissolving pulp as alkali-resistant cellulose fibers, 5% by mass PP fibers (linear density: 3.3 dtex., fiber length: 5 mm), 20% by mass vinylon fibers (linear density: 1.1 dtex., fiber length: 3 mm), and 10% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into paper having a J/W ratio of 3.1 using an inclination type tanmo machine so as to obtain a separator having a thickness of 100.0 μm and a basis weight of 29.0 g/m². This separator has an aspect ratio of tensile strength of 4.5, a maximum pore diameter of 62.0 μm, an average pore diameter of 9.8 μm, a swelling ratio of 38%, a liquid retention rate of 589%, ion resistance of 13.1 mΩ, and gas generation amount of 108 μl/g. Moreover, 2Ω discharge time of an alkaline battery manufactured using this separator is 151 minutes, 100Ω discharge time is 252 hours, and the number of defective batteries is nine when intermittently discharged.

Comparative Example 13

15% by mass solvent spun cellulose fibers (linear density: 1.7 dtex., fiber length: 4 mm) are further refined even after the CSF value reaches 0 ml, and refining is continued until the CSF value that has turned to rise reaches 150 ml. To this are mixed 30% by mass broad leaf tree dissolving pulp as alkali-resistant cellulose fibers, 10% by mass PP fibers (linear density: 3.3 dtex., fiber length: 5 mm), 20% by mass vinylon fibers (linear density: 1.1 dtex., fiber length: 3 mm), and 10% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into paper having a J/W ratio of 1.9 using an inclination type tanmo machine so as to obtain a separator having a thickness of 100.0 μm and a basis weight of 30.0 g/m². This separator has an aspect ratio of tensile strength of 2.2, a maximum pore diameter of 21.0 μm, an average pore diameter of 0.9 μm, a swelling ratio of 35%, a liquid retention rate of 457%, ion resistance of 24.0 mΩ, and gas generation amount of 97 µl/g. Moreover, 2Ω discharge time of an alkaline battery manufactured using this separator is 110 minutes, 100Ω discharge time is 196 hours, and the number of defective batteries is zero when intermittently discharged.

Comparative Example 14

15% by mass solvent spun cellulose fibers (linear density: 1.7 dtex., fiber length: 4 mm) are refined until the CSF value reaches 30 ml. To this are mixed 30% by mass broad leaf tree dissolving pulp as alkali-resistant cellulose fibers, 10% by mass PP fibers (linear density: 3.3 dtex., fiber length: 5 mm), 20% by mass vinylon fibers (linear density: 1.1 dtex., fiber length: 3 mm), and 10% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into paper having a J/W ratio of 0.5 using an inclination type tanmo machine so as to obtain a separator having a thickness of 100.0 µm and a basis weight of 30.0 g/m². This separator has an aspect ratio of tensile strength of 2.0, a maximum pore diameter of 48.0 µm, an average pore diameter of 11.0 µm, a swelling ratio of 36%, a liquid retention rate of 461%, ion resistance of 18.0 mΩ, and gas generation amount of 96 µl/g. Moreover, 2Ω discharge time of an alkaline battery manufactured using this separator is 136 minutes, 100Ω discharge time is 235 hours, and the number of defective batteries is five when intermittently discharged.

Comparative Example 15

20% by mass solvent spun cellulose fibers (linear density: 1.7 dtex., fiber length: 4 mm) are refined until the CSF value reaches 0 ml. To this are mixed 30% by mass viscose rayon fibers (linear density: 1.1 dtex., fiber length: 3 mm) and 10% by mass broad leaf tree dissolving pulp as alkali-resistant cellulose fibers, 10% by mass PP fibers (linear density: 3.3 dtex., fiber length: 5 mm) and 20% by mass vinylon fibers (linear density: 1.1 dtex., fiber length: 3 mm) as alkali-resistant synthetic fibers, and 10% by mass PVA binder fibers (linear density: 1.1 dtex., fiber length: 3 mm) as a binder component.

This mixed raw material is made into paper having a J/W ratio of 2.6 using an inclination type tanmo machine so as to obtain a separator having a thickness of 50.0 µm and a basis weight of 15.0 g/m². This separator has an aspect ratio of tensile strength of 3.1, a maximum pore diameter of 65.0 µm, an average pore diameter of 12.0 µm, a swelling ratio of 43%, a liquid retention rate of 634%, ion resistance of 17.6 mΩ, and gas generation amount of 131 µl/g. Moreover, 2Ω discharge time of an alkaline battery manufactured using this separator is 124 minutes, 100Ω discharge time is 233 hours, and the number of defective batteries is nine when intermittently discharged.

Comparative Example 16

20% by mass solvent spun cellulose fibers (linear density: 1.7 dtex., fiber length: 4 mm) are refined until the CSF value reaches 0 ml. To this are mixed 30% by mass viscose rayon fibers (linear density: 1.1 dtex., fiber length: 3 mm) and 10% by mass broad leaf tree dissolving pulp as alkali-resistant cellulose fibers, 10% by mass PP fibers (linear density: 3.3 dtex., fiber length: 5 mm) and 20% by mass vinylon fibers (linear density: 1.1 dtex., fiber length: 3 mm) as alkali-resistant synthetic fibers, and 10% by mass PVA binder fibers (linear density: 1.1 dtex., fiber length: 3 mm) as a binder component.

This mixed raw material is made into paper having a J/W ratio of 1.7 using an inclination type tanmo machine so as to obtain a separator having a thickness of 160.0 µm and a basis weight of 50.0 g/m². This separator has an aspect ratio of tensile strength of 2.0, a maximum pore diameter of 51.0 µm, an average pore diameter of 8.6 µm, a swelling ratio of 42%, a liquid retention rate of 643%, ion resistance of 24.1 mΩ, and gas generation amount of 129 µl/g. Moreover, 2Ω discharge time of an alkaline battery manufactured using this separator is 105 minutes, 100Ω discharge time is 188 hours, and the number of defective batteries is zero when intermittently discharged.

Conventional Example 1

International Publication No. WO2012/036025A (Patent Document 3) discloses a technology of making a separator with a layered structure made from at least two layers of a rough layer and a dense layer; wherein the rough layer is made from a specified ratio of alkali-resistant cellulose fibers, and is formed from various types of cellulose fibers that have a specified CSF difference, and the CSF of all of the alkali-resistant cellulose fibers is set to a specific value. It is described that as a result, liquid retention is achieved due to high CSF cellulose fibers, the maximum pore size existing in the separator can be reduced due to low CSF cellulose fibers, the necessary liquid retention for an alkaline battery can be secured, generation of dendrite can be effectively controlled, and shock resistance of the separator can be improved.

The separator of Conventional Example 1 is the separator described in Working Example 10 of International Publication No. WO2012/036025A that was published before the present application. In this case, 15% by mass solvent spun cellulose fibers (linear density: 1.7 dtex., fiber length: 2 mm) are refined until reaching a CSF value of 150 ml. To this are mixed 30% by mass mercerized broad leaf tree pulp that has been refined to a CSF value of 705 ml as alkali-resistant cellulose fibers, 40% by mass vinylon fibers (linear density: 0.3 dtex., fiber length: 2 mm) as alkali-resistant synthetic fibers, and 15% by mass PVA binder fibers (linear density: 1.1 dtex., fiber length: 3 mm) as a binder component, so as to make the rough layer.

Meanwhile, 50% by mass solvent spun cellulose fibers (linear density: 1.7 dtex., fiber length: 2 mm) are refined until reaching a CSF value of 125 ml. To this are mixed 35% by mass vinylon fibers (linear density: 0.3 dtex., fiber length: 2 mm) as alkali-resistant synthetic fibers, and 15% by mass PVA binder fibers (linear density: 1.1 dtex., fiber length: 3 mm) as a binder component, so as to make the dense layer. These two kinds of mixed raw material are made into layered paper having a J/W ratio of 1.7 using a cylindrical multilayer paper machine so as to obtain a separator having a thickness of 90.0 µm and a basis weight of 28.0 g/m².

This separator has an aspect ratio of tensile strength of 1.8, a maximum pore diameter of 61.0 µm, an average pore diameter of 12.0 µm, a swelling ratio of 38%, a liquid retention rate of 512%, ion resistance of 13.4 mΩ, and gas generation amount of 127 µl/g. Moreover, 2Ω discharge time of the alkaline battery manufactured using this separator is 135 minutes, 100Ω discharge time is 226 hours, and the number of defective batteries is two when intermittently discharged.

Table 2 gives various physical properties of the separators and alkaline battery evaluation results according to the above working examples, comparative examples and conventional example. Note that the CSF values in Table 2 marked with an asterisk (*) indicate values that are further refined after the CSF value has reached 0 mm.

TABLE 2

| | Blending ratio (%) | | | | | | | | | | | | | |
|---|---|---|---|---|---|---|---|---|---|---|---|---|---|---|
| | Alkali-resistant cellulose fibers | | | | | | | Alkali-resistant synthetic fibers | | | | | | Binder |
| | Solvent spun cellulose | | Ray-on | Coni-fer dis-solving pulp | Broad leaf tree dis-solving pulp | Cot-ton lint-er | Mercer-ized coni-fer pulp | Mercer-ized broad leaf tree pulp | Vi-nylon | PVA | PP | PP/PP | PP/PE | PE | PA | compo-nent |
| | Blend-ing ratio | CSF | | | | | | | | | | | | | | |
| Working Example 1 | 15 | 5 | | | 30 | | | | 20 | 10 | 10 | | | | | 15 |
| Working Example 2 | 5 | 10 | 30 | | 10 | | | | 10 | 20 | 10 | 5 | | | | 10 |
| Working Example 3 | 30 | *100 | 15 | | 15 | | | | | 20 | 10 | | | | | 10 |
| Working Example 4 | 15 | 5 | 30 | | 10 | | | | 20 | 10 | 5 | | | | | 10 |
| Working Example 5 | 25 | *50 | 10 | 10 | | | | | 10 | 10 | 20 | | | 15 | | 15 |
| Working Example 6 | 10 | 1 | 10 | | 20 | | | | 20 | | 10 | | 15 | | | 15 |
| Working Example 7 | 15 | 3 | 40 | | | | | 10 | 10 | 5 | 10 | | | | | 10 |
| Working Example 8 | 10 | 3 | | | | | | 20 | 15 | 20 | 10 | 5 | | | | 20 |
| Working Example 9 | 20 | *30 | 25 | | | 25 | | | 10 | | 10 | | | | | 10 |
| Working Example 10 | 15 | 0 | 15 | | 10 | | | | 20 | 20 | 5 | 5 | | | | 10 |
| Working Example 11 | 15 | *50 | | | 25 | 25 | | | 10 | | 0 | 10 | | | 10 | 15 |
| Working Example 12 | 10 | 0 | | | 20 | | 20 | | 10 | 10 | 15 | | | 10 | | 5 |
| Working Example 13 | 20 | 5 | | | 25 | | | | 20 | 10 | 10 | | | | | 15 |
| Working Example 14 | 25 | 5 | | | 20 | | | | 20 | 10 | 10 | | | | | 15 |
| Working Example 15 | 15 | 5 | | | 30 | | | | 20 | 10 | 10 | | | | | 15 |
| Working Example 16 | 15 | 0 | 20 | | 15 | | | | 15 | 15 | 10 | | | | | 10 |
| Comparative Example 1 | 35 | 10 | | | 5 | | | | 15 | 15 | 15 | | | | | 15 |
| Comparative Example 2 | 2 | *100 | | | 28 | | | | 20 | 20 | 10 | | | | | 20 |
| Comparative Example 3 | 25 | 5 | 30 | | 20 | | | | 10 | | 10 | | | | | 5 |
| Comparative Example 4 | 15 | 0 | | | 10 | | | | 20 | 20 | 15 | | | | | 20 |
| Comparative Example 5 | 15 | 2 | 20 | | 20 | | | | 17 | 15 | 3 | | | | | 10 |
| Comparative Example 6 | 15 | 2 | 25 | | | | | | 15 | 10 | 25 | | | | | 10 |
| Comparative Example 7 | 15 | 0 | | 20 | 20 | 10 | | | | 15 | | | | | | 20 |
| Comparative Example 8 | 15 | 3 | | | 35 | | | | 20 | 20 | 7 | | | | | 3 |
| Comparative Example 9 | 15 | 3 | | | 20 | | | | 15 | 15 | 10 | | | | | 25 |
| Comparative Example 10 | 10 | 3 | 50 | | | | | | 20 | | 10 | | | | | 10 |
| Comparative Example 11 | 15 | 5 | 30 | | 10 | | | | 20 | 10 | 5 | | | | | 10 |
| Comparative Example 12 | 15 | 5 | 30 | | 10 | | | | 20 | 10 | 5 | | | | | 10 |
| Comparative Example 13 | 15 | *150 | | | 30 | | | | 20 | 10 | 10 | | | | | 15 |
| Comparative Example 14 | 15 | 30 | | | 30 | | | | 20 | 10 | 10 | | | | | 15 |
| Comparative Example 15 | 20 | 0 | 30 | | 10 | | | | 20 | | 10 | | | | | 10 |
| Comparative Example 16 | 20 | 0 | 30 | | 10 | | | | 20 | | 10 | | | | | 10 |
| Conventional Example 1 Rough layer | 15 | 150 | | | | | | 30 | 40 | | | | | | | 15 |
| Dense layer | 50 | 125 | | | | | | | 35 | | | | | | | 15 |

| | Separator physical properties | | | | | | | | Battery test | | |
|---|---|---|---|---|---|---|---|---|---|---|---|
| | Thick-ness μm | Basis weight g/m² | Aspect ratio of tensile strength | Maximum diameter μm | Average pore diameter μm | Swelling ratio % | Liquid reten-tion rate % | Ion resis-tance mΩ | Gas gener-ation rate μl/g | 2Ω dis-charge time min. | 100Ω dis-charge time hour | Number of defects |
| Working Example 1 | 120 | 40 | 1.6 | 31 | 7.8 | 34 | 432 | 13.3 | 90 | 143 | 245 | 0 |
| Working Example 2 | 60 | 20 | 2.0 | 60 | 10 | 40 | 608 | 14 | 96 | 145 | 239 | 0 |
| Working Example 3 | 140 | 45 | 1.8 | 25 | 1.1 | 43 | 652 | 13.9 | 114 | 155 | 258 | 0 |
| Working Example 4 | 100 | 30 | 1.5 | 32 | 4.6 | 42 | 621 | 13.5 | 110 | 141 | 244 | 0 |
| Working Example 5 | 80 | 23 | 1.5 | 31 | 9.1 | 38 | 478 | 11.5 | 101 | 141 | 240 | 0 |
| Working Example 6 | 95 | 30 | 2.4 | 54 | 8.3 | 40 | 597 | 12.4 | 94 | 149 | 238 | 0 |
| Working Example 7 | 120 | 40 | 1.6 | 49 | 5.4 | 45 | 684 | 12.8 | 119 | 142 | 241 | 0 |
| Working Example 8 | 80 | 25 | 1.7 | 45 | 6.4 | 30 | 400 | 13.9 | 94 | 156 | 248 | 0 |
| Working Example 9 | 74 | 24 | 1.4 | 35 | 4.4 | 44 | 700 | 12.6 | 122 | 149 | 246 | 0 |
| Working Example 10 | 133 | 39 | 2.2 | 52 | 7.7 | 37 | 469 | 10.9 | 91 | 137 | 238 | 0 |
| Working Example 11 | 125 | 39 | 1.0 | 39 | 2.6 | 38 | 475 | 13.1 | 89 | 144 | 239 | 0 |
| Working Example 12 | 95 | 26 | 1.4 | 30 | 4.3 | 35 | 453 | 11.6 | 91 | 141 | 237 | 0 |
| Working Example 13 | 100 | 30 | 1.0 | 23 | 3.0 | 33 | 434 | 13.5 | 87 | 140 | 244 | 0 |
| Working Example 14 | 100 | 30 | 2.5 | 47 | 9.8 | 34 | 448 | 10.9 | 91 | 139 | 242 | 0 |
| Working Example 15 | 100 | 30 | 1.4 | 20 | 1.2 | 33 | 431 | 13.2 | 88 | 147 | 246 | 0 |
| Working Example 16 | 138 | 42 | 1.8 | 40 | 5.4 | 40 | 601 | 13.2 | 104 | 143 | 240 | 0 |
| Comparative Example 1 | 118 | 38 | 1.7 | 18 | 2.2 | 38 | 476 | 25 | 99 | 109 | 194 | 0 |
| Comparative Example 2 | 58 | 18 | 1.9 | 65 | 12 | 32 | 418 | 17 | 98 | 135 | 213 | 7 |
| Comparative Example 3 | 138 | 41 | 1.6 | 49 | 8.3 | 55 | 697 | 10.8 | 141 | 118 | 207 | 3 |
| Comparative Example 4 | 97 | 32 | 1.6 | 45 | 8 | 28 | 377 | 12.2 | 94 | 103 | 201 | 0 |
| Comparative Example 5 | 104 | 35 | 1.5 | 61 | 11.4 | 46 | 612 | 11.3 | 93 | 108 | 196 | 5 |
| Comparative Example 6 | 100 | 25 | 2.2 | 47 | 7.7 | 31 | 390 | 13.1 | 109 | 126 | 222 | 0 |

TABLE 2-continued

| | | | | | | | | | | | | |
|---|---|---|---|---|---|---|---|---|---|---|---|---|
| Comparative Example 7 | | 100 | 30 | 1.6 | 28 | 7.7 | 39 | 496 | 14.8 | 136 | — | — | — |
| Comparative Example 8 | | 127 | 40 | 1.2 | 39 | 8.3 | 41 | 511 | 11.5 | 90 | — | — | — |
| Comparative Example 9 | | 94 | 27 | 1.5 | 30 | 6.3 | 27 | 388 | 12.4 | 91 | 105 | 207 | 0 |
| Comparative Example 10 | | 120 | 38 | 1.7 | 51 | 9.6 | 62 | 744 | 12.4 | 114 | 120 | 220 | 0 |
| Comparative Example 11 | | 105 | 31 | 0.7 | 19 | 2.6 | 39 | 593 | 13.5 | 110 | — | — | — |
| Comparative Example 12 | | 100 | 29 | 4.5 | 62 | 9.8 | 38 | 589 | 13.1 | 108 | 151 | 252 | 9 |
| Comparative Example 13 | | 100 | 30 | 2.2 | 21 | 0.9 | 35 | 457 | 24 | 97 | 110 | 196 | 0 |
| Comparative Example 14 | | 100 | 30 | 2.0 | 48 | 11 | 36 | 461 | 18 | 96 | 136 | 235 | 5 |
| Comparative Example 15 | | 50 | 15 | 3.1 | 65 | 12 | 43 | 634 | 17.6 | 131 | 124 | 233 | 9 |
| Comparative Example 16 | | 160 | 50 | 2.0 | 51 | 8.6 | 42 | 643 | 24.1 | 129 | 105 | 188 | 0 |
| Conventional Example 1 | Rough layer Dense layer | 90 | 28 | 1.8 | 61 | 12 | 38 | 512 | 13.4 | 127 | 135 | 226 | 2 |

Each of the working examples given in Table 2 has an aspect ratio of tensile strength within a range of 1.0 to 2.5, a maximum pore diameter of 20.0 to 60.0 μm, and an average pore diameter of 1.0 to 10.0 μm. When comparing the battery test results of the respective working examples and the battery test results of the conventional example, two defects occur during intermittent discharge in the conventional example, while not even one occurs in the working examples. Moreover, the light load discharge time at 100Ω in the respective working examples is better than in the conventional example. That is, it can be understood that the separator according to this embodiment is a favorable separator having both shielding property and discharging characteristics that have been conventionally considered conflicting characteristics.

The separator of Comparative Example 1 has a high ion resistance of 25 mΩ, and the alkaline battery using this separator has shorter discharge times for both light load discharge and high rate load discharge than the conventional example. This is thought to be natural because setting the content of fibrillated solvent spun cellulose fibers to 35% by mass causes the maximum pore diameter to be less than 20 μm.

Meanwhile, the alkaline battery using the separator of Comparative Example 2 has seven defects occurring during intermittent discharge. This is thought to be natural because the content of fibrillated solvent spun cellulose fibers is low or 2% by mass, the maximum pore diameter is 65.0 μm, the average pore diameter is 12 μm, and both the maximum pore diameter and the average pore diameter are large. It can be seen from the respective working examples, Comparative Example 1, and Comparative Example 2 that the content of fibrillated solvent spun cellulose fibers is preferably 5 to 30% by mass.

The alkaline battery using the separator of Comparative Example 3 has three defects occurring during intermittent discharge. This is thought to result from a high total content of cellulose fibers of 75% by mass, and increase in gas generation amount of the separator. Moreover, due to a high content of cellulose fibers, the swelling ratio of the separator is also increased.

Meanwhile, the separator of Comparative Example 4 has a low or 25% by mass total content of cellulose fibers, and a high or 55% by mass total content of synthetic fibers. Therefore, it is thought that liquid retention of the separator is reduced, and discharge time of the alkaline battery is shortened. It can be seen from the respective working examples, Comparative Example 3 and Comparative Example 4 that the total content of alkali-resistant synthetic fibers is preferably 30 to 70% by mass.

The separator of Comparative Example 5 has a low or 3% by mass content of PP fibers. Therefore, the swelling ratio of the separator is 46%, which is high. As a result, the amount of cathode agent that is injected when manufacturing an alkaline battery is decreased, and the discharge time of the alkaline battery using this separator is shortened.

The separator of Comparative Example 6 has a high or 25% by mass content ratio of PP fibers. Therefore, as a result of hydrophobicity of the separator becoming high, and retention of electrolytic solution being reduced, the discharge time of the alkaline battery is shortened. It can be seen from the respective working examples, Comparative Example 5 and Comparative Example 6 that the content of PP fibers is preferably 5 to 20% by mass.

The separator of Comparative Example 7 has a low or 15% by mass total content of synthetic fibers, and thus welding a cylindrical bottom part during formation of a cylindrical separator when manufacturing the battery is impossible. Therefore, a battery test is not conducted. It can be seen from the respective working examples, Comparative Example 4 and Comparative Example 7 that the content of synthetic fibers is preferably 20 to 50% by mass.

The separator of Comparative Example 8 has a weak sheet strength, and thus the separator breaks during formation of a cylindrical separator when manufacturing the battery. This is thought to be natural because the content of binder component is low or 3% by mass. Moreover, since the separator breaks during cylinder formation, a battery test is not conducted.

The separator of Comparative Example 9 has a low liquid retention rate of the separator, and the discharge time of the alkaline battery using this separator is decreased. This is because the content of binder component is high or 25% by mass. It can be seen from the respective working examples, Comparative Example 8 and Comparative Example 9 that the content of binder component is preferably 5 to 20% by mass.

The separator of Comparative Example 10 has a 50% by mass content of non-fibrillated regenerated cellulose fibers, the swelling ratio of the separator is high, the amount of cathode agent that is injected when manufacturing an alkaline battery is decreased, and the discharge time of the alkaline battery using this separator is decreased.

It can be seen from the respective working examples and Comparative Example 10 that if the content of non-fibrillated regenerated cellulose fibers is 40% by mass or less, the swelling ratio can be suppressed to 45% or less, which is favorable.

Moreover, it can be understood through comparison of Working Examples 2 to 7, 9, 10, and 16 which contain 10% by mass or more non-fibrillated regenerated cellulose fibers, with the other working examples that the more the non-fibrillated regenerated cellulose fibers are contained, the higher the liquid retention rate of the separator.

The separator of Comparative Example 11 has a low bending rigidity, and a defect occurs during formation of a cylindrical separator when manufacturing the battery. Therefore, battery evaluation is not carried out. It is thought that this is because the aspect ratio of tensile strength is less than 1.0.

The separator of Comparative Example 12 has a large maximum pore diameter of 62 µm. It is thought that this is because the aspect ratio of tensile strength is 4.5. Nine defects occur during intermittent discharge of the alkaline battery using this separator.

It can be seen from the respective working examples, Comparative Example 1 and Comparative Example 12 that the maximum pore diameter of the separator is preferably 20 to 60 µm, and the aspect ratio of tensile strength is preferably 1.0 to 2.5.

The alkaline battery using the separator of Comparative Example 13 has a short discharge time. This is thought to be natural because the average pore diameter of the separator is decreased to 0.9 µm, and the ion resistance of the separator is increased to 24 mΩ.

The alkaline battery using the separator of Comparative Example 14 has five defects during intermittent discharge. This is thought to be natural because the average pore diameter of the separator is 11 µm. It can be seen from the respective working examples, Comparative Example 13 and Comparative Example 14 that the average pore diameter of the separator is preferably 1.0 to 10.0 µm.

The separator of Comparative Example 15 has a thickness of 50 µm and a basis weight of 15.0 g/m$^2$. Since the basis weight of the separator is small and the density is low, denseness of the separator is insufficient, the maximum pore diameter is increased to 65 µm and the average pore diameter to 12 µm, and the alkaline battery using this separator has nine defects during intermittent discharge. The separator of Comparative Example 16 has a thickness of 160 µm and a basis weight of 50.0 g/m$^2$. Therefore, the discharge time of the alkaline battery using this separator is shortened.

A curl is generated in the separator in the inward direction of the cylinder, which is thought to derive from difference in degree of elasticity of each layer when the separator is immersed in an electrolytic solution in the manufacturing process of an alkaline battery using the separator of Conventional Example 1. Therefore, workability in the step of injecting a gelatinous cathode agent in the cylinder of the separator is poor.

As described above, according to the first embodiment, a separator having a controlled maximum pore diameter and a high shielding property can be provided. Moreover, control of the aspect ratio of tensile strength allows provision of a separator having an appropriate bending rigidity as the separator for alkaline batteries, improvement in reliability for preventing internal short-circuits of the alkaline battery using the separator of this embodiment, and improvement in workability of the separator at the time of manufacturing the battery.

Furthermore, the multi-layered separator of this embodiment is made of layers of the same material, and since there is no difference between the front and the back of the separator, no curves (curls) are generated even if immersed in an alkaline electrolytic solution. Further, a separator having an appropriate shielding property as a separator for alkaline batteries can also be provided.

Use of PP fibers as the alkali-resistant synthetic fibers allows implementation of a separator having a low swelling ratio as well as demonstrating favorable liquid retention, resulting in an alkaline battery having high liquid retention of electrolytic solution and excellent discharge characteristics.

In addition, according to this embodiment, a sufficient shielding effect against growth of dendrite can be achieved. Here, the dendrite inside of the alkaline battery grows within pores in the separator, wherein this dendrite makes the anode and the cathode have electrical contact, resulting in a short circuit in the alkaline battery.

The average pore diameter of the separator is equal to the size of gaps between the fibers, while large pores expected as having a maximum pore diameter are generated due to the manufacturing method of the wet nonwoven fabric. Making the average pore diameter of the separator smaller certainly suppresses growth of dendrite. However, in the case where the maximum pore diameter is not controlled, since the maximum pore diameter of the separator is large even if the average pore diameter is small, dendrite grows in such large pores, leading to an internal short-circuit.

Accordingly, in this embodiment, by controlling the maximum pore diameter and the average pore diameter generating in the wet nonwoven fabric so as to be reduced, reliability of preventing internal short-circuits when used as a separator for an alkaline battery is improved.

Meanwhile, the filling amount of the cathode agent is important for the discharge capacity of the alkaline battery. If the swelling ratio of the separator is high, the volume of the separator within the battery is increased, and the filling amount of the cathode agent is decreased. In this embodiment, through control of swelling of the separator, when manufacturing a battery, the volume of the separator within the battery is decreased, and the filling amount of the cathode agent is increased, resulting in a high-capacity alkaline battery.

Moreover, since electrolytic solution retention of the separator is important for discharge time of the alkaline battery, in this embodiment, life prolongation of the battery is achieved by improving the liquid retention rate of the separator. Furthermore, in this embodiment, control of the swelling ratio of the separator increases in the filling amount of the cathode agent of the alkaline battery, thereby increasing the discharge capacity of the battery.

Second Embodiment

Details of a second embodiment of the present invention is described next.

According to the second embodiment, a separator simultaneously satisfying liquid retention and swelling ratio that can improve discharging characteristics and shielding property, which can prevent internal short-circuits due to dendrite of metal oxides etc., may be provided. More specifically, a separator for alkaline batteries constituted by a wet nonwoven fabric made of alkali-resistant cellulose fibers, alkali-resistant synthetic fibers, and a binder component, having a maximum pore diameter of 15 to 35 µm, an average pore diameter of 1.0 to 10.0 µm, liquid retention rate of 450 to 700% during immersion in 40% by mass KOH, and a swelling ratio of 45 to 55% during immersion in 40% by mass KOH.

Even in the second embodiment, not only is the average pore diameter very important for improvement in shielding property of the separator, but so is control of the maximum pore diameter, and thus the maximum pore diameter of the separator is set to 15.0 to 35.0 μm. If the maximum pore diameter exceeds 35.0 μm, the shielding property of the separator cannot be improved, and if it is less than 15.0 μm, the separator becomes too dense, leading to increase in resistance when assembling the battery. Moreover, by setting the aspect ratio of tensile strength within a range of 1.0 to 2.5, the maximum pore diameter is kept within a range of 15.0 to 35.0 μm.

Note that control of the maximum pore diameter and the average pore diameter of the separator according to the second embodiment is the same as in the first embodiment, and description thereof is omitted. Moreover, while the raw material fibers used in paper making in the second embodiment are also the same as in the first embodiment, it is preferable in the second embodiment that ranges of CSF values indicating degree of refining are 10 to 0 ml for CSF values that are decreasing through refining, and 100 ml or less for CSF values that are rising. This is because when the decreasing CSF is greater than 10 ml, sufficient denseness of the separator due to fibrillated materials cannot be obtained. On the other hand, when the CSF value that has turned to rise exceeds 100 ml, the fibers become too fine, and are inappropriate as a separator raw material for batteries.

The liquid retention rate of 40% by mass KOH of the separator for alkaline batteries of this embodiment is preferably 450% or higher. If the liquid retention rate of 40% by mass KOH is less than 450%, there is a problem that the high-rate discharge property is degraded. While the higher the liquid retention rate the better, there is a limit to the amount of electrolytic solution that a separator can effectively retain, and approximately 700% is the considered upper limit. Moreover, by setting content of alkali-resistant cellulose fibers within a range of 30 to 70% by mass, the liquid retention rate of the separator can be set to 450 to 700%.

Furthermore, alkali-resistant synthetic fibers used for the alkaline battery of this embodiment can preferably contain acetalized polyvinyl alcohol fibers (referred to as vinylon fibers hereafter) and non-acetalized polyvinyl alcohol fibers (referred to as PVA fibers hereafter). These fibers are also favorable in terms of alkali resistance as well as bending rigidity of the separator. The content of non-fibrillated regenerated cellulose fibers is preferably within the range of 10 to 40% by mass, as in the first embodiment.

While the content of vinylon fibers and PVA fibers can be increased or decreased according to characteristics required by the separator, the bending rigidity of the separator, which is the most distinctive feature of the polyvinyl alcohol fibers, is lost with less than 10% by mass, and the swelling ratio tends to be too high. Meanwhile, in the case where the content is greater than 50% by mass, since retention of the electrolytic solution tends to decrease due to an excessive amount of the polyvinyl alcohol fibers, a range of 10 to 50% by mass is preferable in order to implement high levels of liquid retention and bending rigidity.

PVA fibers have a lower fusion point than vinylon fibers, and have excellent thermal adhesiveness among separators themselves during the battery manufacturing steps, and are therefore more favorable. Moreover, the 40% by mass KOH swelling ratio of the separator for alkaline batteries according to this embodiment is preferably 45 to 55%. The internal resistance when used for an alkaline battery increases with a swelling ratio less than 45%. Meanwhile, when the swelling ratio exceeds 55%, the volume of the separator within the battery case is increased, and the filling amount of the cathode agent is thus decreased.

According to an implementation means for making the 40% by mass KOH swelling ratio of the separator for alkaline batteries be 45 to 55% as described above, the total content of vinylon fibers and PVA fibers used as alkali-resistant synthetic fibers may be 10 to 50% by mass.

Other alkali-resistant synthetic fibers used in the alkaline battery can be selected from the group consisting of polyamide fibers (referred to as PA fibers hereafter), polypropylene fibers (referred to as PP fibers hereafter), polyethylene fibers (referred to as PE fibers hereafter), PP/PE conjugated fibers, PP/modified PP conjugated fibers, PA/modified PA conjugated fibers, PP synthetic pulp, and PE synthetic pulp, which can be contained up to 20 to 50% by mass of the separator together with vinylon fibers and PVA fibers.

A separator for alkaline batteries is manufactured through the following steps in the second embodiment.

(1) Disperse in water the aforementioned solvent spun cellulose fibers that can be fibrillated, and refine them to a predetermined CSF value using a refining device for paper making such as a beater or a refiner.

(2) Mix one or more types of the aforementioned non-fibrillated cellulose pulp with the refined fibers.

(3) Further mix in one or more types of the non-fibrillated cellulose pulp as needed.

(4) Further mix in vinylon fibers and PVA fibers as alkali-resistant synthetic fibers having excellent dimensional stability in an alkaline electrolytic solution, and other alkali-resistant synthetic fibers as needed.

(5) Fibers to be a binder component such as PVA binder fibers are then added and mixed to make a raw material.

(6) Make paper from this raw material using a cylindrical machine, a tanmo machine, an inclination type tanmo machine, a Fourdrinier machine, and/or a combination paper making machine made from a combination thereof.

Note that even in the second embodiment, as in the first embodiment, the wet nonwoven fabric may be monolayer or multi-layer, and the method of combining layers in the case of multi-layer is the same as in the first embodiment.

DESCRIPTION OF WORKING EXAMPLES

Specific examples of a separator for alkaline batteries and an alkaline battery using the separator are described in detail below as working examples according to the second embodiment of the present invention. Note that the present invention and this embodiment are not limited to the descriptions of these working examples. Moreover, the test methods of the separator are the same as in the first embodiment, and description thereof is therefore omitted.

Even in the second embodiment, separators according to the following working examples, comparative examples and conventional example are manufactured using the alkali-resistant cellulose fibers and alkali-resistant synthetic fibers given in Table 1.

Working Example 21

15% by mass solvent spun cellulose fibers (linear density: 1.7 dtex., fiber length: 4 mm) are further refined even after the CSF value reaches 0 ml, and refining is continued until the CSF value that has turned to rise reaches 10 ml. To this are mixed 15% by mass viscose rayon fibers (linear density: 1.1 dtex., fiber length: 3 mm) and 25% by mass broad leaf tree dissolving pulp as alkali-resistant cellulose fibers, 25% by mass vinylon fibers (linear density: 1.1 dtex., fiber length: 3 mm) and 10% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 1.6 using an inclination type tanmo/cylindrical combination paper making machine so as to obtain a double layer separator having a thickness of 100.0 µm and a basis weight of 30.0 g/m². This separator has an aspect ratio of tensile strength of 1.5, a maximum pore diameter of 22.0 µm, an average pore diameter of 2.4 µm, a swelling ratio of 51.0%, a liquid retention rate of 585%, ion resistance of 13.5 mΩ, and gas generation amount of 110 µl/g. Moreover, 2Ω discharge time of an alkaline battery manufactured using this separator is 141 minutes, 100Ω discharge time is 244 hours, and the number of defective batteries is zero when intermittently discharged.

Working Example 22

5% by mass solvent spun cellulose fibers (linear density: 1.7 dtex., fiber length: 3 mm) are refined until the CSF value reaches 10 ml. To this are mixed 30% by mass viscose rayon fibers (linear density: 0.8 dtex., fiber length: 3 mm) and 25% by mass broad leaf tree dissolving pulp as alkali-resistant cellulose fibers, 20% by mass vinylon fibers (linear density: 1.1 dtex., fiber length: 3 mm) and 10% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into paper having a J/W ratio of 1.9 using an inclination type tanmo machine so as to obtain a double layer separator having a thickness of 60.0 µm and a basis weight of 20.0 g/m². This separator has an aspect ratio of tensile strength of 2.0, a maximum pore diameter of 35.0 µm, an average pore diameter of 8.0 µm, a swelling ratio of 53.0%, a liquid retention rate of 638%, ion resistance of 14.0 mΩ, and gas generation amount of 96 µl/g. Moreover, 2Ω discharge time of an alkaline battery manufactured using this separator is 145 minutes, 100Ω discharge time is 239 hours, and the number of defective batteries is zero when intermittently discharged.

Working Example 23

30% by mass solvent spun cellulose fibers (linear density: 3.3 dtex., fiber length: 5 mm) are further refined even after the CSF value reaches 0 ml, and refining is continued until the CSF value that has turned to rise reaches 100 mL To this are mixed 15% by mass viscose rayon fibers (linear density: 1.7 dtex., fiber length: 3 mm) and 10% by mass broad leaf tree dissolving pulp as alkali-resistant cellulose fibers, 15% by mass vinylon fibers (linear density: 1.1 dtex., fiber length: 3 mm) and 20% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 1.6 using an inclination type tanmo/cylindrical combination paper making machine so as to obtain a double layer separator having a thickness of 140.0 µm and a basis weight of 45.0 g/m². This separator has an aspect ratio of tensile strength of 1.8, a maximum pore diameter of 15.0 µm, an average pore diameter of 1.1 µm, a swelling ratio of 51.0%, a liquid retention rate of 571%, ion resistance of 13.9 mΩ, and gas generation amount of 114 µl/g. Moreover, 2Ω discharge time of an alkaline battery manufactured using this separator is 155 minutes, 100Ω discharge time is 258 hours, and the number of defective batteries is zero when intermittently discharged.

Working Example 24

20% by mass solvent spun cellulose fibers (linear density: 1.7 dtex., fiber length: 5 mm) are refined until the CSF value reaches 8 ml. To this are mixed 10% by mass viscose rayon fibers (linear density: 0.8 dtex., fiber length: 4 mm) and 30% by mass broad leaf tree dissolving pulp as alkali-resistant cellulose fibers, 10% by mass vinylon fibers (linear density: 0.6 dtex., fiber length: 3 mm), 10% by mass PVA fibers (linear density: 1.1 dtex., fiber length: 2 mm), and 10% by mass PP fibers (linear density: 0.8 dtex., fiber length: 5 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 2.1 using a Fourdrinier/cylindrical combination paper making machine so as to obtain a double layer separator having a thickness of 95.0 µm and a basis weight of 30.0 g/m². This separator has an aspect ratio of tensile strength of 2.4, a maximum pore diameter of 33.0 µm, an average pore diameter of 8.1 µm, a swelling ratio of 53.0%, a liquid retention rate of 622%, ion resistance of 12.4 mΩ, and gas generation amount of 94 µl/g. Moreover, 2Ω discharge time of an alkaline battery manufactured using this separator is 149 minutes, 100Ω discharge time is 238 hours, and the number of defective batteries is zero when intermittently discharged.

Working Example 25

20% by mass solvent spun cellulose fibers (linear density: 1.7 dtex., fiber length: 4 mm) are refined until the CSF value reaches 5 ml. To this are mixed 40% by mass viscose rayon fibers (linear density: 0.6 dtex., fiber length: 3 mm) as alkali-resistant cellulose fibers, 10% by mass vinylon fibers (linear density: 1.1 dtex., fiber length: 3 mm), 10% by mass PVA fibers (linear density: 1.1 dtex., fiber length: 2 mm), and 10% by mass PP/modified PP conjugated fibers (linear density: 0.8 dtex., fiber length: 5 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 0.7 using an inclination type tanmo/cylindrical combination paper making machine so as to obtain a double layer separator having a thickness of 120.0 µm and a basis weight of 40.0 g/m². This separator has an aspect ratio of tensile strength of 1.6, a maximum pore diameter of 19.0 µm, an average pore diameter of 6.2 µm, a swelling ratio of 54.0%, a liquid retention rate of 674%, ion resistance of 12.8 mΩ, and gas generation amount of 119 µl/g. Moreover, 2Ω discharge time of an alkaline battery manufactured using this separator is 142 minutes, 100Ω discharge time is 241 hours, and the number of defective batteries is zero when intermittently discharged.

Working Example 26

15% by mass solvent spun cellulose fibers (linear density: 1.7 dtex., fiber length: 5 mm) are refined until the CSF value reaches 2 ml. To this are mixed 15% by mass viscose rayon fibers (linear density: 3.3 dtex., fiber length: 4 mm) as alkali-resistant cellulose fibers, 20% by mass vinylon fibers (linear density: 1.1 dtex., fiber length: 2 mm), 20% by mass PVA fibers (linear density: 1.1 dtex., fiber length: 2 mm), and 10% by mass PP/modified PE conjugated fibers (linear density: 0.8 dtex., fiber length: 5 mm) as alkali-resistant synthetic fibers, and 20% by mass PVA binder fibers (linear density: 1.1 dtex., fiber length: 3 mm) as a binder component.

This mixed raw material is made into layered paper having a J/W ratio of 0.6 using an inclination type tanmo/cylindrical combination paper making machine so as to obtain a double layer separator having a thickness of 125.0 μm and a basis weight of 39.0 g/m². This separator has an aspect ratio of tensile strength of 1.8, a maximum pore diameter of 26.0 μm, an average pore diameter of 7.6 μm, a swelling ratio of 45.0%, a liquid retention rate of 451%, ion resistance of 13.7 mΩ, and gas generation amount of 86 μl/g. Moreover, 2Ω discharge time of an alkaline battery manufactured using this separator is 156 minutes, 100Ω discharge time is 251 hours, and the number of defective batteries is zero when intermittently discharged.

Working Example 27

25% by mass solvent spun cellulose fibers (linear density: 1.7 dtex., fiber length: 2 mm) are refined until the CSF value reaches 0 ml. To this are mixed 25% by mass viscose rayon fibers (linear density: 1.1 dtex., fiber length: 3 mm), 10% by mass conifer dissolving pulp, and 10% by mass mercerized broad leaf tree pulp as alkali-resistant cellulose fibers, 5% by mass vinylon fibers (linear density: 0.6 dtex., fiber length: 2 mm), 10% by mass PVA fibers (linear density: 1.1 dtex., fiber length: 2 mm), and 10% by mass PA fibers as alkali-resistant synthetic fibers, and 5% by mass PVA binder fibers (linear density: 1.1 dtex., fiber length: 3 mm) as a binder component.

This mixed raw material is made into layered paper having a J/W ratio of 1.3 using an inclination type tanmo/cylindrical combination paper making machine so as to obtain a double layer separator having a thickness of 74.0 μm and a basis weight of 24.0 g/m². This separator has an aspect ratio of tensile strength of 1.4, a maximum pore diameter of 17.0 μm, an average pore diameter of 4.2 μm, a swelling ratio of 55.0%, a liquid retention rate of 700%, ion resistance of 12.6 mΩ, and gas generation amount of 122 μl/g. Moreover, 2Ω discharge time of an alkaline battery manufactured using this separator is 149 minutes, 100Ω discharge time is 246 hours, and the number of defective batteries is zero when intermittently discharged.

Working Example 28

20% by mass solvent spun cellulose fibers (linear density: 1.7 dtex., fiber length: 4 mm) are further refined even after the CSF value reaches 0 ml, and refining is continued until the CSF value that has turned to rise reaches 30 ml. To this are mixed 10% by mass viscose rayon fibers (linear density: 1.1 dtex., fiber length: 3 mm) and 10% by mass cotton linter pulp as alkali-resistant cellulose fibers, 25% by mass vinylon fibers (linear density: 1.1 dtex., fiber length: 3 mm) and 25% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into paper having a J/W ratio of 1.2 using an inclination type tanmo machine so as to obtain a separator having a thickness of 112.0 μm and a basis weight of 36.0 g/m². This separator has an aspect ratio of tensile strength of 1.1, a maximum pore diameter of 24.0 μm, an average pore diameter of 5.5 μm, a swelling ratio of 46.0%, a liquid retention rate of 502%, ion resistance of 13.1 mΩ, and gas generation amount of 108 μl/g. Moreover, 2Ω discharge time of an alkaline battery manufactured using this separator is 155 minutes, 100Ω discharge time is 252 hours, and the number of defective batteries is zero when intermittently discharged.

Working Example 29

20% by mass solvent spun cellulose fibers (linear density: 1.7 dtex., fiber length: 4 mm) are further refined even after the CSF value reaches 0 ml, and refining is continued until the CSF value that has turned to rise reaches 50 ml. To this are mixed 30% by mass viscose rayon fibers (linear density: 0.8 dtex., fiber length: 3 mm) and 15% by mass mercerized conifer pulp as alkali-resistant cellulose fibers, 10% by mass PVA fibers (linear density: 1.1 dtex., fiber length: 2 mm) and 15% by mass PE fibers (linear density: 3.3 dtex., fiber length: 5 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 2.0 using an inclination type tanmo/cylindrical combination paper making machine so as to obtain a double layer separator having a thickness of 83.0 μm and a basis weight of 27.0 g/m². This separator has an aspect ratio of tensile strength of 2.3, a maximum pore diameter of 30.0 μm, an average pore diameter of 3.7 μm, a swelling ratio of 53.0%, a liquid retention rate of 668%, ion resistance of 11.5 mΩ, and gas generation amount of 101 μl/g. Moreover, 2Ω discharge time of an alkaline battery manufactured using this separator is 141 minutes, 100Ω discharge time is 240 hours, and the number of defective batteries is zero when intermittently discharged.

Working Example 30

10% by mass solvent spun cellulose fibers (linear density: 1.7 dtex., fiber length: 4 mm) are further refined even after the CSF value reaches 0 ml, and refining is continued until the CSF value that has turned to rise reaches 75 ml. To this are mixed 30% by mass viscose rayon fibers (linear density: 1.1 dtex., fiber length: 3 mm) and 25% by mass broad leaf tree dissolving pulp as alkali-resistant cellulose fibers, 10% by mass vinylon fibers (linear density: 0.6 dtex., fiber length: 3 mm) and 10% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 1.1 using an inclination type tanmo/inclination type tanmo combination paper making machine so as to obtain a double layer separator having a thickness of 94.0 μm and a basis weight of 32.0 g/m². This separator has an aspect ratio of tensile strength of 1.2, a maximum pore diameter of 28.0 μm, an average pore diameter of 1.7 μm, a swelling ratio of 53.0%, a liquid retention rate of 645%, ion resistance of 13.4 mΩ, and gas generation amount of 118 μl/g. Moreover, 2Ω discharge time of an alkaline battery manufactured using this separator is 139 minutes, 100Ω discharge time is 241 hours, and the number of defective batteries is zero when intermittently discharged.

Comparative Example 21

2% by mass solvent spun cellulose fibers (linear density: 1.7 dtex., fiber length: 4 mm) are refined until the CSF value reaches 0 ml. To this are mixed 33% by mass viscose rayon fibers (linear density: 1.1 dtex., fiber length: 3 mm) and 10% by mass broad leaf tree dissolving pulp as alkali-resistant cellulose fibers, 20% by mass vinylon fibers (linear density: 1.1 dtex., fiber length: 3 mm) and 20% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 1.8 using an inclination type tanmo/cylindrical combination paper making machine so as to obtain a double layer separator having a thickness of 57.0 µm and a basis weight of 19.0 g/m². This separator has an aspect ratio of tensile strength of 1.7, a maximum pore diameter of 46.0 µm, an average pore diameter of 7.8 µm, a swelling ratio of 48.0%, a liquid retention rate of 570%, ion resistance of 17.0 mΩ, and gas generation amount of 104 µl/g. Moreover, 2Ω discharge time of an alkaline battery manufactured using this separator is 129 minutes, 100Ω discharge time is 228 hours, and the number of defective batteries is ten when intermittently discharged.

Comparative Example 22

35% by mass solvent spun cellulose fibers (linear density: 1.7 dtex., fiber length: 4 mm) are refined until the CSF value reaches 0 ml. To this are mixed 15% by mass viscose rayon fibers (linear density: 1.1 dtex., fiber length: 3 mm) as alkali-resistant cellulose fibers, 20% by mass vinylon fibers (linear density: 1.1 dtex., fiber length: 3 mm) and 20% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 2.0 using a Fourdrinier/tanmo machine so as to obtain a double layer separator having a thickness of 117.0 µm and a basis weight of 37.6 g/m². This separator has an aspect ratio of tensile strength of 2.4, a maximum pore diameter of 13.0 µm, an average pore diameter of 1.6 µm, a swelling ratio of 46.0%, a liquid retention rate of 558%, ion resistance of 25.0 mΩ, and gas generation amount of 99 µl/g. Moreover, 2Ω discharge time of an alkaline battery manufactured using this separator is 109 minutes, 100Ω discharge time is 193 hours, and the number of defective batteries is zero when intermittently discharged.

Comparative Example 23

20% by mass solvent spun cellulose fibers (linear density: 1.7 dtex., fiber length: 4 mm) are refined until the CSF value reaches 20 ml. To this are mixed 20% by mass viscose rayon fibers (linear density: 1.1 dtex., fiber length: 3 mm) and 10% by mass broad leaf tree dissolving pulp as alkali-resistant cellulose fibers, 15% by mass vinylon fibers (linear density: 1.1 dtex., fiber length: 3 mm) and 20% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 1.6 using an inclination type tanmo/cylindrical combination paper making machine so as to obtain a double layer separator having a thickness of 143.0 µm and a basis weight of 46.0 g/m². This separator has an aspect ratio of tensile strength of 1.8, a maximum pore diameter of 34.0 µm, an average pore diameter of 13.0 µm, a swelling ratio of 50.0%, a liquid retention rate of 570%, ion resistance of 11.2 mΩ, and gas generation amount of 101 µl/g. Moreover, 2Ω discharge time of an alkaline battery manufactured using this separator is 133 minutes, 100Ω discharge time is 226 hours, and the number of defective batteries is eight when intermittently discharged.

Comparative Example 24

20% by mass solvent spun cellulose fibers (linear density: 1.7 dtex., fiber length: 4 mm) are further refined even after the CSF value reaches 0 ml, and refining is continued until the CSF value that has turned to rise reaches 150 mL To this are mixed 20% by mass viscose rayon fibers (linear density: 1.1 dtex., fiber length: 3 mm) and 10% by mass broad leaf tree dissolving pulp as alkali-resistant cellulose fibers, 15% by mass vinylon fibers (linear density: 1.1 dtex., fiber length: 3 mm) and 20% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 1.3 using an inclination type tanmo/cylindrical combination paper making machine so as to obtain a double layer separator having a thickness of 42.0 µm and a basis weight of 14.0 g/m². This separator has an aspect ratio of tensile strength of 1.6, a maximum pore diameter of 17.0 µm, an average pore diameter of 0.9 µm, a swelling ratio of 49.0%, a liquid retention rate of 566%, ion resistance of 24.6 mΩ, and gas generation amount of 89 µl/g. Moreover, 2Ω discharge time of an alkaline battery manufactured using this separator is 116 minutes, 100Ω discharge time is 199 hours, and the number of defective batteries is zero when intermittently discharged.

Comparative Example 25

20% by mass solvent spun cellulose fibers (linear density: 1.7 dtex., fiber length: 4 mm) are refined until the CSF value reaches 2 ml. To this are mixed 45% by mass viscose rayon fibers (linear density: 1.1 dtex., fiber length: 3 mm) as alkali-resistant cellulose fibers, 10% by mass vinylon fibers (linear density: 1.1 dtex., fiber length: 3 mm) and 15% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into layered paper having a J/W ratio of 0.6 using an inclination type tanmo/cylindrical combination paper making machine so as to obtain a double layer separator having a thickness of 155.0 µm and a basis weight of 50.0 g/m². This separator has an aspect ratio of tensile strength of 1.7, a maximum pore diameter of 20.0 µm, an average pore diameter of 9.4 µm, a swelling ratio of 56.0%, a liquid retention rate of 664%, ion resistance of 14.4 mΩ, and gas generation amount of 125 µl/g. Moreover, 2Ω discharge time of an alkaline battery manufactured using this separator is 130 minutes, 100Ω discharge time is 211 hours, and the number of defective batteries is zero when intermittently discharged.

Comparative Example 26

20% by mass solvent spun cellulose fibers (linear density: 1.7 dtex., fiber length: 4 mm) are refined until the CSF value reaches 2 ml. To this are mixed 5% by mass viscose rayon fibers (linear density: 1.1 dtex., fiber length: 3 mm) and 20% by mass broad leaf tree dissolving pulp as alkali-resistant cellulose fibers, 20% by mass vinylon fibers (linear density: 1.1 dtex., fiber length: 3 mm) and 20% by mass PVA fibers (linear density: 1.1 dtex., fiber length: 2 mm) as alkali-resistant synthetic fibers, and 15% by mass PVA binder fibers (linear density: 1.1 dtex., fiber length: 3 mm) as a binder component.

This mixed raw material is made into layered paper having a J/W ratio of 1.7 using an inclination type tanmo/cylindrical combination paper making machine so as to obtain a double layer separator having a thickness of 120.0 μm and a basis weight of 39.0 g/m². This separator has an aspect ratio of tensile strength of 1.8, a maximum pore diameter of 32.0 μm, an average pore diameter of 7.0 μm, a swelling ratio of 46.0%, a liquid retention rate of 449%, ion resistance of 12.4 mΩ, and gas generation amount of 114 μl/g. Moreover, 2Ω discharge time of an alkaline battery manufactured using this separator is 121 minutes, 100Ω discharge time is 208 hours, and the number of defective batteries is zero when intermittently discharged.

Comparative Example 27

25% by mass solvent spun cellulose fibers (linear density: 1.7 dtex., fiber length: 4 mm) are refined until the CSF value reaches 5 ml. To this are mixed 35% by mass viscose rayon fibers (linear density: 1.1 dtex., fiber length: 3 mm) and 15% by mass broad leaf tree dissolving pulp as alkali-resistant cellulose fibers, 10% by mass vinylon fibers (linear density: 1.1 dtex., fiber length: 3 mm) and 10% by mass PP fibers (linear density: 3.3 dtex., fiber length: 5 mm) as alkali-resistant synthetic fibers, and 5% by mass PVA binder fibers (linear density: 1.1 dtex., fiber length: 3 mm) as a binder component.

This mixed raw material is made into layered paper having a J/W ratio of 0.9 using an inclination type tanmo/cylindrical combination paper making machine so as to obtain a double layer separator having a thickness of 138.0 μm and a basis weight of 44.0 g/m². This separator has an aspect ratio of tensile strength of 1.6, a maximum pore diameter of 34.0 μm, an average pore diameter of 8.1 μm, a swelling ratio of 59.0%, a liquid retention rate of 754%, ion resistance of 24.4 mΩ, and gas generation amount of 141 μl/g. Moreover, 2Ω discharge time of an alkaline battery manufactured using this separator is 118 minutes, 100Ω discharge time is 207 hours, and the number of defective batteries is three when intermittently discharged.

Comparative Example 28

15% by mass solvent spun cellulose fibers (linear density: 1.7 dtex., fiber length: 4 mm) are refined until the CSF value reaches 5 ml. To this are mixed 10% by mass viscose rayon fibers (linear density: 1.1 dtex., fiber length: 3 mm) as alkali-resistant cellulose fibers, 20% by mass vinylon fibers (linear density: 1.1 dtex., fiber length: 3 mm), 20% by mass PVA fibers (linear density: 1.1 dtex., fiber length: 2 mm), and 15% by mass PP fibers (linear density: 3.3 dtex., fiber length: 5 mm) as alkali-resistant synthetic fibers, and 20% by mass PVA binder fibers (linear density: 1.1 dtex., fiber length: 3 mm) as a binder component.

This mixed raw material is made into paper having a J/W ratio of 1.2 using an inclination type tanmo machine so as to obtain a separator having a thickness of 88.0 μm and a basis weight of 28.0 g/m². This separator has an aspect ratio of tensile strength of 1.1, a maximum pore diameter of 33.0 μm, an average pore diameter of 8.9 μm, a swelling ratio of 42.0%, a liquid retention rate of 434%, ion resistance of 10.8 mΩ, and gas generation amount of 87 μl/g. Moreover, 2Ω discharge time of an alkaline battery manufactured using this separator is 123 minutes, 100Ω discharge time is 216 hours, and the number of defective batteries is one when intermittently discharged.

Comparative Example 29

20% by mass solvent spun cellulose fibers (linear density: 1.7 dtex., fiber length: 4 mm) are refined until the CSF value reaches 8 ml. To this are mixed 20% by mass viscose rayon fibers (linear density: 1.1 dtex., fiber length: 3 mm) and 20% by mass broad leaf tree dissolving pulp as alkali-resistant cellulose fibers, 5% by mass PVA fibers (linear density: 1.1 dtex., fiber length: 2 mm) and 15% by mass PP fibers (linear density: 3.3 dtex., fiber length: 5 mm) as alkali-resistant synthetic fibers, and 20% by mass PVA binder fibers (linear density: 1.1 dtex., fiber length: 3 mm) as a binder component.

This mixed raw material is made into layered paper having a J/W ratio of 1.4 using an inclination type tanmo/cylindrical combination paper making machine so as to obtain a double layer separator having a thickness of 100.0 μm and a basis weight of 33.0 g/m². This separator has an aspect ratio of tensile strength of 1.5, a maximum pore diameter of 19.0 μm, an average pore diameter of 11.2 μm, a swelling ratio of 57.0%, a liquid retention rate of 607%, ion resistance of 11.3 mΩ, and gas generation amount of 93 μl/g. Moreover, 25Ω discharge time of an alkaline battery manufactured using this separator is 108 minutes, 100Ω discharge time is 196 hours, and the number of defective batteries is zero when intermittently discharged.

Comparative Example 30

20% by mass solvent spun cellulose fibers (linear density: 1.7 dtex., fiber length: 4 mm) are refined until the CSF value reaches 8 ml. To this are mixed 10% by mass viscose rayon fibers (linear density: 1.1 dtex., fiber length: 3 mm) as alkali-resistant cellulose fibers, 30% by mass vinylon fibers (linear density: 1.1 dtex., fiber length: 3 mm) and 30% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into paper having a J/W ratio of 0.5 using an inclination type tanmo machine so as to obtain a separator having a thickness of 104.0 μm and a basis weight of 34.0 g/m². This separator has an aspect ratio of tensile strength of 2.2, a maximum pore diameter of 31.0 μm, an average pore diameter of 7.5 μm, a swelling ratio of 45.0%, a liquid retention rate of 425%, ion resistance of 13.1 mΩ, and gas generation amount of 109 μl/g. Moreover, 2Ω discharge time of an alkaline battery manufactured using this separator is 126 minutes, 100Ω discharge time is 224 hours, and the number of defective batteries is two when intermittently discharged.

Comparative Example 31

30% by mass solvent spun cellulose fibers (linear density: 1.7 dtex., fiber length: 4 mm) are further refined even after the CSF value reaches 0 ml, and refining is continued until the CSF value that has turned to rise reaches 10 ml. To this are mixed 35% by mass viscose rayon fibers (linear density:

1.1 dtex., fiber length: 3 mm) as alkali-resistant cellulose fibers, 15% by mass PVA fibers (linear density: 1.1 dtex., fiber length: 2 mm) as alkali-resistant synthetic fibers, and 20% by mass PVA binder fibers (linear density: 1.1 dtex., fiber length: 3 mm) as a binder component.

This mixed raw material is made into paper having a J/W ratio of 2.1 using a cylindrical machine so as to obtain a separator having a thickness of 71.0 μm and a basis weight of 23.0 g/m$^2$. This separator has an aspect ratio of tensile strength of 2.3, a maximum pore diameter of 22 μm, an average pore diameter of 6.2 μm, a swelling ratio of 52.0%, a liquid retention rate of 616%, ion resistance of 12.4 mΩ, and gas generation amount of 117 μl/g. While manufacturing an alkaline battery using this separator has been attempted, a discharge test is not conducted since a blending ratio of the alkali-resistant synthetic fibers is low, and welding is impossible when forming a part to become a bottom through heat welding.

Comparative Example 32

30% by mass solvent spun cellulose fibers (linear density: 1.7 dtex., fiber length: 4 mm) are further refined even after the CSF value reaches 0 ml, and refining is continued until the CSF value that has turned to rise reaches 10 ml. To this are mixed 30% by mass viscose rayon fibers (linear density: 1.1 dtex., fiber length: 3 mm) as alkali-resistant cellulose fibers, 19% by mass vinylon fibers (linear density: 1.1 dtex., fiber length: 3 mm) and 19% by mass PVA fibers (linear density: 1.1 dtex., fiber length: 2 mm) as alkali-resistant synthetic fibers, and 2% by mass PVA binder fibers (linear density: 1.1 dtex., fiber length: 3 mm) as a binder component.

This mixed raw material is made into paper having a J/W ratio of 2.2 using an inclination type tanmo machine so as to obtain a separator having a thickness of 111.0 μm and a basis weight of 35.0 g/m$^2$. This separator has an aspect ratio of tensile strength of 2.4, a maximum pore diameter of 24.0 μm, an average pore diameter of 5.6 μm, a swelling ratio of 54.0%, a liquid retention rate of 648%, ion resistance of 10.5 mΩ, and gas generation amount of 122 μl/g. While manufacturing an alkaline battery using this separator has been attempted, a discharge test is not conducted since a blending ratio of the PVA binder fibers as a binder component is low, resulting in a weak separator strength and a defect occurring at the time of cylinder formation.

Comparative Example 33

25% by mass solvent spun cellulose fibers (linear density: 1.7 dtex., fiber length: 4 mm) are further refined even after the CSF value reaches 0 ml, and refining is continued until the CSF value that has turned to rise reaches 10 ml. To this are mixed 20% by mass viscose rayon fibers (linear density: 1.1 dtex., fiber length: 3 mm) as alkali-resistant cellulose fibers, 15% by mass vinylon fibers (linear density: 1.1 dtex., fiber length: 3 mm) and 15% by mass PVA fibers (linear density: 1.1 dtex., fiber length: 2 mm) as alkali-resistant synthetic fibers, and 25% by mass PVA binder fibers (linear density: 1.1 dtex., fiber length: 3 mm) as a binder component.

This mixed raw material is made into paper having a J/W ratio of 1.7 using an inclination type tanmo machine so as to obtain a separator having a thickness of 115.0 μm and a basis weight of 39.0 g/m$^2$. This separator has an aspect ratio of tensile strength of 1.9, a maximum pore diameter of 17.0 μm, an average pore diameter of 5.0 μm, a swelling ratio of 39.0%, a liquid retention rate of 411%, ion resistance of 22.4 mΩ, and gas generation amount of 94 μl/g. Moreover, 2Ω discharge time of an alkaline battery manufactured using this separator is 114 minutes, 100Ω discharge time is 215 hours, and the number of defective batteries is zero when intermittently discharged.

Comparative Example 34

15% by mass solvent spun cellulose fibers (linear density: 1.7 dtex., fiber length: 4 mm) are further refined even after the CSF value reaches 0 ml, and refining is continued until the CSF value that has turned to rise reaches 10 ml. To this are mixed 15% by mass viscose rayon fibers (linear density: 1.1 dtex., fiber length: 3 mm) and 25% by mass broad leaf tree dissolving pulp as alkali-resistant cellulose fibers, 25% by mass vinylon fibers (linear density: 1.1 dtex., fiber length: 3 mm) and 10% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into paper having a J/W ratio of 0.4 using an inclination type tanmo machine so as to obtain a separator having a thickness of 50.0 μm and a basis weight of 15.0 g/m$^2$. This separator has an aspect ratio of tensile strength of 3.1, a maximum pore diameter of 45.0 μm, an average pore diameter of 11.8 μm, a swelling ratio of 51.0%, a liquid retention rate of 586%, ion resistance of 17.6 mΩ, and gas generation amount of 131 μl/g. Moreover, 2Ω discharge time of an alkaline battery manufactured using this separator is 124 minutes, 100Ω discharge time is 233 hours, and the number of defective batteries is nine when intermittently discharged.

Comparative Example 35

15% by mass solvent spun cellulose fibers (linear density: 1.7 dtex., fiber length: 4 mm) are further refined even after the CSF value reaches 0 ml, and refining is continued until the CSF value that has turned to rise reaches 10 ml. To this are mixed 15% by mass viscose rayon fibers (linear density: 1.1 dtex., fiber length: 3 mm) and 25% by mass broad leaf tree dissolving pulp as alkali-resistant cellulose fibers, 25% by mass vinylon fibers (linear density: 1.1 dtex., fiber length: 3 mm) and 10% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into paper having a J/W ratio of 2.0 using an inclination type tanmo machine so as to obtain a separator having a thickness of 160.0 μm and a basis weight of 50.0 g/m$^2$. This separator has an aspect ratio of tensile strength of 2.0, a maximum pore diameter of 18.0 μm, an average pore diameter of 8.4 μm, a swelling ratio of 52.0%, a liquid retention rate of 603%, ion resistance of 24.1 mΩ, and gas generation amount of 129 μl/g. Moreover, 2Ω discharge time of an alkaline battery manufactured using this separator is 122 minutes, 100Ω discharge time is 194 hours, and the number of defective batteries is two when intermittently discharged.

Comparative Example 36

25% by mass solvent spun cellulose fibers (linear density: 1.7 dtex., fiber length: 4 mm) are further refined even after the CSF value reaches 0 ml, and refining is continued until the CSF value that has turned to rise reaches 50 ml. To this are mixed 15% by mass viscose rayon fibers (linear density: 1.1 dtex., fiber length: 3 mm) and 15% by mass broad leaf tree dissolving pulp as alkali-resistant cellulose fibers, 25% by mass vinylon fibers (linear density: 1.1 dtex., fiber length: 3 mm) and 10% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into paper having a J/W ratio of 1.0 using an inclination type tanmo machine so as to obtain a separator having a thickness of 105.0 μm and a basis weight of 31.0 g/m². This separator has an aspect ratio of tensile strength of 0.7, a maximum pore diameter of 12.0 μm, an average pore diameter of 2.6 μm, a swelling ratio of 52.0%, a liquid retention rate of 596%, ion resistance of 13.5 mΩ, and gas generation amount of 110 μl/g. Note that while manufacturing an alkaline battery using this separator has been attempted, a discharge test is not conducted since there is no resilience due to too small an MD/CD ratio and a defect occurring at the time of cylinder formation.

Comparative Example 37

15% by mass solvent spun cellulose fibers (linear density: 1.7 dtex., fiber length: 4 mm) are refined until the CSF value reaches 5 ml. To this are mixed 15% by mass viscose rayon fibers (linear density: 1.1 dtex., fiber length: 3 mm) and 25% by mass broad leaf tree dissolving pulp as alkali-resistant cellulose fibers, 25% by mass vinylon fibers (linear density: 1.1 dtex., fiber length: 3 mm) and 10% by mass PVA fibers (linear density: 1.1 dtex., fiber length: 2 mm) as alkali-resistant synthetic fibers, and 10% by mass PVA binder fibers (linear density: 1.1 dtex., fiber length: 3 mm) as a binder component.

This mixed raw material is made into paper having a J/W ratio of 3.8 using an inclination type tanmo machine so as to obtain a separator having a thickness of 100.0 μm and a basis weight of 29.0 g/m². This separator has an aspect ratio of tensile strength of 4.5, a maximum pore diameter of 37.0 μm, an average pore diameter of 9.8 μm, a swelling ratio of 51.0%, a liquid retention rate of 584%, ion resistance of 13.1 mΩ, and gas generation amount of 108 μl/g. Moreover, 2Ω discharge time of an alkaline battery manufactured using this separator is 151 minutes, 100Ω discharge time is 252 hours, and the number of defective batteries is four when intermittently discharged.

Since Conventional Example 1 is the same as Conventional Example 1 given in Table 2, description thereof and battery test results are omitted.

Table 3 gives various physical properties of the separators and alkaline battery evaluation results according to the above working examples, comparative examples and conventional example. Note that the CSF values in Table 3 marked with an asterisk (*) indicate values that are further refined after the CSF value has reached 0 mm.

TABLE 3

| | Blending ratio (%) | | | | | | | | | | | | | |
|---|---|---|---|---|---|---|---|---|---|---|---|---|---|---|
| | Alkali-resistant cellulose fibers | | | | | | | | | | | | | |
| | Solvent spun cellulose | | Rayon | Conifer dissolving pulp | Broad leaf tree dissolving pulp | Cotton linter | Mercerized conifer pulp | Mercerized broad leaf tree pulp | Alkali-resistant synthetic fibers | | | | | Binder component |
| | Blending ratio | CSF | | | | | | | Vinylon | PVA | PP | PP/PP | PP/PE | PE | PA | |
| Working Example 21 | 15 | *10 | 15 | | 25 | | | | 25 | 10 | | | | | | 10 |
| Working Example 22 | 5 | 10 | 30 | | 25 | | | | 20 | 10 | | | | | | 10 |
| Working Example 23 | 30 | *100 | 15 | | 10 | | | | 15 | 20 | | | | | | 10 |
| Working Example 24 | 20 | 8 | 10 | | 30 | | | | 10 | 10 | 10 | | | | | 10 |
| Working Example 25 | 20 | 5 | 40 | | | | | | 10 | 10 | | 10 | | | | 10 |
| Working Example 26 | 15 | 2 | 15 | | | | | | 20 | 20 | | | 10 | | | 20 |
| Working Example 27 | 25 | 0 | 25 | 10 | | | | 10 | 5 | 10 | | | | | 10 | 5 |
| Working Example 28 | 20 | *30 | 10 | | | 10 | | | 25 | 25 | | | | | | 10 |
| Working Example 29 | 20 | *50 | 30 | | | | 15 | | | 10 | | | | 15 | | 10 |
| Working Example 30 | 10 | *75 | 30 | | 25 | | | | 10 | 10 | | | | | | 15 |
| Comparative Example 21 | 2 | 0 | 33 | | 10 | | | | 20 | 20 | | | | | | 15 |
| Comparative Example 22 | 35 | 0 | 15 | | | | | | 20 | 20 | | | | | | 10 |
| Comparative Example 23 | 20 | 20 | 20 | | 10 | | | | 15 | 20 | | | | | | 15 |
| Comparative Example 24 | 20 | *150 | 20 | | 10 | | | | 15 | 20 | | | | | | 15 |
| Comparative Example 25 | 20 | 2 | 45 | | | | | | 10 | 15 | | | | | | 10 |
| Comparative Example 26 | 20 | 2 | 5 | | 20 | | | | 20 | 20 | | | | | | 15 |
| Comparative Example 27 | 25 | 5 | 35 | | 15 | | | | 10 | | 10 | | | | | 5 |
| Comparative Example 28 | 15 | 5 | 10 | | | | | | 20 | 20 | 15 | | | | | 20 |
| Comparative Example 29 | 20 | 8 | 20 | | 20 | | | | | 5 | 15 | | | | | 20 |
| Comparative Example 30 | 20 | 8 | 10 | | | | | | 30 | 30 | | | | | | 10 |
| Comparative Example 31 | 30 | *10 | 35 | | | | | | | 15 | | | | | | 20 |
| Comparative Example 32 | 30 | *10 | 30 | | | | | | 19 | 19 | | | | | | 2 |
| Comparative Example 33 | 25 | *10 | 20 | | | | | | 15 | 15 | | | | | | 25 |
| Comparative Example 34 | 15 | *10 | 15 | | 25 | | | | 25 | 10 | | | | | | 10 |
| Comparative Example 35 | 15 | *10 | 15 | | 25 | | | | 25 | 10 | | | | | | 10 |
| Comparative Example 36 | 25 | *50 | 15 | | 15 | | | | 25 | 10 | | | | | | 10 |
| Comparative Example 37 | 15 | 5 | 15 | | 25 | | | | 25 | 10 | | | | | | 10 |
| Conventional Example 1  Rough layer | 15 | 150 | | | | | | 30 | 40 | | | | | | | 15 |
| Dense layer | 50 | 125 | | | | | | | 35 | | | | | | | 15 |

TABLE 3-continued

|  | | Separator physical properties | | | | | | | | Battery test | | |
| --- | --- | --- | --- | --- | --- | --- | --- | --- | --- | --- | --- | --- |
|  | | Thickness μm | Basis weight g/m² | Aspect ratio of tensile strength | Maximum pore diameter μm | Average pore diameter μm | Swelling ratio % | Liquid retention % | Ion resistance mΩ | Gas generation rate μl/g | 2Ω discharge time min. | 100Ω discharge time hour | Number of defects |
| Working Example 21 | | 100 | 30 | 1.5 | 22 | 2.4 | 51 | 585 | 13.5 | 110 | 141 | 244 | 0 |
| Working Example 22 | | 60 | 20 | 2 | 35 | 8 | 53 | 638 | 14 | 96 | 145 | 239 | 0 |
| Working Example 23 | | 140 | 45 | 1.8 | 15 | 1.1 | 51 | 571 | 13.9 | 114 | 155 | 258 | 0 |
| Working Example 24 | | 95 | 30 | 2.4 | 33 | 8.1 | 53 | 622 | 12.4 | 94 | 149 | 238 | 0 |
| Working Example 25 | | 120 | 40 | 1.6 | 19 | 6.2 | 54 | 674 | 12.8 | 119 | 142 | 241 | 0 |
| Working Example 26 | | 125 | 39 | 1.8 | 26 | 7.6 | 45 | 451 | 13.7 | 86 | 156 | 251 | 0 |
| Working Example 27 | | 74 | 24 | 1.4 | 17 | 4.2 | 55 | 700 | 12.6 | 122 | 149 | 246 | 0 |
| Working Example 28 | | 112 | 36 | 1.1 | 24 | 5.5 | 46 | 502 | 13.1 | 108 | 155 | 252 | 0 |
| Working Example 29 | | 83 | 27 | 2.3 | 30 | 3.7 | 53 | 668 | 11.5 | 101 | 141 | 240 | 0 |
| Working Example 30 | | 94 | 32 | 1.2 | 28 | 1.7 | 53 | 645 | 13.4 | 118 | 139 | 241 | 0 |
| Comparative Example 21 | | 57 | 19 | 1.7 | 46 | 7.8 | 48 | 570 | 17 | 104 | 129 | 228 | 10 |
| Comparative Example 22 | | 117 | 37.6 | 2.4 | 13 | 1.6 | 46 | 558 | 25 | 99 | 109 | 193 | 0 |
| Comparative Example 23 | | 143 | 46 | 1.8 | 34 | 13 | 50 | 570 | 11.2 | 101 | 133 | 226 | 8 |
| Comparative Example 24 | | 42 | 14 | 1.6 | 17 | 0.9 | 49 | 566 | 24.6 | 89 | 116 | 199 | 0 |
| Comparative Example 25 | | 155 | 50 | 1.7 | 20 | 9.4 | 56 | 664 | 14.4 | 125 | 130 | 211 | 0 |
| Comparative Example 26 | | 120 | 39 | 1.8 | 32 | 7 | 46 | 449 | 12.4 | 114 | 121 | 208 | 0 |
| Comparative Example 27 | | 138 | 44 | 1.6 | 34 | 8.1 | 59 | 754 | 24.4 | 141 | 118 | 207 | 3 |
| Comparative Example 28 | | 88 | 28 | 1.1 | 33 | 8.9 | 42 | 434 | 10.8 | 87 | 123 | 216 | 1 |
| Comparative Example 29 | | 100 | 33 | 1.5 | 19 | 11.2 | 57 | 607 | 11.3 | 93 | 108 | 196 | 0 |
| Comparative Example 30 | | 104 | 34 | 2.2 | 31 | 7.5 | 45 | 425 | 13.1 | 109 | 126 | 224 | 2 |
| Comparative Example 31 | | 71 | 25 | 2.3 | 22 | 6.2 | 52 | 616 | 12.4 | 117 | — | — | — |
| Comparative Example 32 | | 111 | 35 | 2.4 | 24 | 5.6 | 54 | 648 | 10.5 | 122 | — | — | — |
| Comparative Example 33 | | 115 | 39 | 1.9 | 17 | 5 | 39 | 411 | 22.4 | 94 | 114 | 215 | 0 |
| Comparative Example 34 | | 50 | 15 | 3.1 | 45 | 11.8 | 51 | 586 | 17.6 | 131 | 124 | 233 | 9 |
| Comparative Example 35 | | 160 | 50 | 2 | 18 | 8.4 | 52 | 603 | 24.1 | 129 | 122 | 194 | 2 |
| Comparative Example 36 | | 105 | 31 | 0.7 | 12 | 2.6 | 52 | 596 | 13.5 | 110 | — | — | — |
| Comparative Example 37 | | 100 | 29 | 4.5 | 37 | 9.8 | 51 | 584 | 13.1 | 108 | 151 | 252 | 4 |
| Conventional Example 1 | Rough layer Dense layer | 90 | 28 | 1.8 | 61 | 12 | 38 | 512 | 13.4 | 127 | 135 | 226 | 2 |

Each of the working examples given in Table 3 has an aspect ratio of tensile strength within a range of 1.0 to 2.5, a maximum pore diameter of 15.0 to 35.0 μm, an average pore diameter of 1.0 to 10.0 μm, and a liquid retention rate of 450 to 700%. When comparing the battery test results of the respective working examples and the battery test results of the conventional example, two defects occur during intermittent discharge in the conventional example, while not even one occurs in the working examples. Moreover, the light load discharge time at 100Ω in the respective working examples is better than in the conventional example. That is, it can be understood that the separator according to this embodiment is a favorable separator having both shielding property and discharging characteristics that have been conventionally considered conflicting characteristics.

The alkaline battery using the separator of Comparative Example 21 has ten defects occurring during intermittent discharge. This is thought to be natural because the content of fibrillated solvent spun cellulose fibers is low or 2% by mass, and the maximum pore diameter exceeds 35.0 μm.

Meanwhile, the separator of Comparative Example 22 has a high or 25 mΩ ion resistance, and the alkaline battery using this separator has shorter discharge times for both light load discharge and high rate load discharge than the conventional example. This is thought to be natural because setting the content of fibrillated solvent spun cellulose fibers to 35% by mass causes the maximum pore diameter to be less than 15 μm. It can be seen from the respective working examples, Comparative Example 21, and Comparative Example 22 that the content of fibrillated solvent spun cellulose fibers is preferably 5 to 30% by mass.

The separator of Comparative Example 23 has an average pore diameter of 13.0 μm, and the alkaline battery using this separator has eight defects occurring during intermittent discharge. The separator of Comparative Example 24 has a high ion resistance, and thus the alkaline battery using this separator has a short discharge time. It can be seen from the respective working examples, Comparative Example 23, and Comparative Example 24 that the average pore diameter of the separator is preferably 1.0 to 10.0 μm.

The separator of Comparative Example 25 has a 45% by mass content of non-fibrillated regenerated cellulose fibers, the swelling ratio of the separator is high, the amount of cathode agent that is injected when manufacturing an alkaline battery is decreased, and the discharge time of the alkaline battery using this separator is decreased.

The separator of Comparative Example 26 has a 5% by mass content of non-fibrillated regenerated cellulose fibers, the liquid retention rate of the separator is low, and thus the discharge time of the alkaline battery using this separator is decreased. It is understood from the respective working examples, Comparative Example 25 and Comparative Example 26 that the content of non-fibrillated regenerated cellulose fibers is preferably 10 to 40% by mass.

The alkaline battery using the separator of Comparative Example 27 has three defects during intermittent discharge. This is thought to result from a high or 75% by mass total content of cellulose fibers, and increase in gas generation amount of the separator.

Meanwhile, the separator of Comparative Example 28 has a low or 25% by mass total content of cellulose fibers, and a high or 55% by mass total content of synthetic fibers.

Therefore, it is thought that the liquid retention rate of the separator is reduced, and that discharge time of the alkaline battery is shortened. It is understood from the respective working examples, Comparative Example 27 and Comparative Example 28 that the total content of alkali-resistant cellulose fibers is preferably 30 to 70% by mass.

The separator of Comparative Example 29 has a low or 5% by mass total content of vinylon fibers and PVA fibers. Moreover, the swelling ratio of the separator is 57%, which is high. As a result, the amount of cathode agent that is injected when manufacturing an alkaline battery is decreased, and thus the discharge time of the alkaline battery using this separator is decreased.

The separator of Comparative Example 30 has a high or 60% by mass total content of vinylon fibers and PVA fibers. Therefore, as a result of hydrophobicity of the separator becoming stronger, and retention of electrolytic solution being reduced, the discharge time of the alkaline battery is shortened. It can be seen from the respective working examples, Comparative Example 29 and Comparative Example 30 that the total content of vinylon fibers and PVA fibers is preferably 10 to 50% by mass.

The separator of Comparative Example 31 has a low or 15% by mass total content of synthetic fibers, and thus welding a cylindrical bottom part during formation of a cylindrical separator when manufacturing the battery is impossible-, and thus a battery test is not conducted. It can be seen from the respective working examples, Comparative Example 28 and Comparative Example 31 that the total content of synthetic fibers is preferably 20 to 50% by mass.

The separator of Comparative Example 32 has a weak sheet strength, and thus the separator breaks during formation of a cylindrical separator when manufacturing the battery. This is thought to be natural because the content of binder component is low or 2% by mass. Moreover, since the separator breaks during cylinder formation, a battery test is not conducted.

The separator of Comparative Example 33 has a low liquid retention rate, and thus the discharge time of the alkaline battery using this separator is decreased. This is because the content of binder component is high or 25% by mass. It is understood from the respective working examples, Comparative Example 32 and Comparative Example 33 that the content of binder component is preferably 5 to 20% by mass.

The separator of Comparative Example 34 has a thickness of 50 μm and a basis weight of 15.0 g/m². Since the basis weight of the separator is small and the density is low, denseness of the separator is insufficient, the maximum pore diameter is increased to 45.0 μm and the average pore diameter to 11.8 μm, and the alkaline battery using this separator has nine defects occurring during intermittent discharge. Moreover, the separator of Comparative Example 35 has a thickness of 160 μm and a basis weight of 50.0 g/m². Therefore, the discharge time of the alkaline battery using this separator is shortened.

The separator of Comparative Example 36 has a low bending rigidity, and thus a defect occurs during formation of a cylindrical separator when manufacturing the battery. It is thought that this is because the aspect ratio of tensile strength is less than 1.0. Therefore, battery evaluation is not performed.

The separator of Comparative Example 37 has a large maximum pore diameter of 37 μm. It is thought that this is because the aspect ratio of tensile strength is 4.5. Nine defects occur during intermittent discharge from the alkaline battery using this separator. It can be seen from the respective working examples, Comparative Example 36 and Comparative Example 37 that the maximum pore diameter of the separator is preferably 15 to 35 μm, and in order to attain these pore diameters, the aspect ratio of tensile strength should be preferably 1.0 to 2.5.

As described above, according to the second embodiment, a separator having a controlled maximum pore diameter and a high shielding property can be provided. Moreover, control of the aspect ratio of tensile strength allows provision of a separator having an appropriate bending rigidity as the separator for alkaline batteries, improvement in reliability for preventing internal short-circuits of the alkaline battery using the separator of this embodiment, and improvement in workability of the separator at the time of manufacturing the battery.

Furthermore, since each layer of the multi-layered separator even of this embodiment is made of the same material, and there is no difference between front and back of the separator, no curves (curls) are generated even if immersed in an alkaline electrolytic solution. Further, a separator having an appropriate shielding property as a separator for alkaline batteries can also be provided by setting the CSF value of solvent spun cellulose fibers to 10 to 0 ml, and by setting the CSF value having turned to rise to 0 to 100 ml.

Yet further, use of non-fibrillated regenerated cellulose fibers as alkali-resistant cellulose fibers aside from the solvent spun cellulose fibers allows further improvement in liquid retention of the separator. Yet even further, use of vinylon fibers and PVA fibers as alkali-resistant synthetic fibers allows improvement in thermal adhesiveness among separators themselves, and implementation of a separator having a small swelling ratio while demonstrating favorable liquid retention. Use of this separator for alkaline batteries allows improvement in workability in the battery manufacturing steps, and achievement of an alkaline battery having high liquid retention of electrolytic solution and excellent discharge characteristics.

The invention claimed is:

1. A separator for an alkaline battery, said separator comprising a wet nonwoven fabric which contains at least alkali-resistant cellulose fibers and alkali-resistant synthetic fibers, and is bound by a binder component; wherein:
    an average pore diameter of the wet nonwoven fabric is 1 to 10 μm,
    a maximum pore diameter of the wet nonwoven fabric is 15 to 60 μm,
    a liquid retention rate of the wet nonwoven fabric during immersion in a 40% by mass KOH solution is 400 to 700%, and
    a swelling ratio of the wet nonwoven fabric during immersion in the 40% by mass KOH solution is 30 to 55%.

2. The separator for an alkaline battery according to claim 1, wherein:
    the maximum pore diameter of the wet nonwoven fabric is 20 to 60 μm, and
    the swelling ratio of the wet nonwoven fabric during immersion in the 40% by mass KOH solution is 30 to 45%.

3. The separator for an alkaline battery according to claim 1, wherein
    the maximum pore diameter of the wet nonwoven fabric is 15 to 35 μm,
    the liquid retention rate of the wet nonwoven fabric during immersion in the 40% by mass KOH solution is 450 to 700%, and the swelling ratio of the wet nonwoven fabric during immersion in the 40% by mass KOH solution is 45 to 55%.

4. The separator for an alkaline battery according to claim 1, wherein the alkali-resistant cellulose fibers comprise at least one component selected from the group consisting of fibrillated solvent spun cellulose fibers and non-fibrillated cellulose.

5. The separator for an alkaline battery according to claim 2, wherein the alkali-resistant synthetic fibers comprise at least polypropylene fibers.

6. The separator for an alkaline battery according to claim 3, wherein the alkali-resistant synthetic fibers comprise at least one component selected from the group consisting of non-acetalized polyvinyl alcohol fibers and acetalized polyvinyl alcohol fibers.

7. The separator for an alkaline battery according to claim 4, wherein the non-fibrillated cellulose comprises at least regenerated cellulose fibers.

8. An alkaline battery using a separator, wherein said separator comprises a wet nonwoven fabric which contains at least alkali-resistant cellulose fibers and alkali-resistant synthetic fibers, and is bound by a binder component; wherein:
an average pore diameter of the wet nonwoven fabric is 1 to 10 µm
a maximum pore diameter of the wet nonwoven fabric is 15 to 60 µm,
a liquid retention rate of the wet nonwoven fabric during immersion in a 40% by mass KOH solution is 400 to 700%, and
a swelling ratio of the wet nonwoven fabric during immersion in the 40% by mass KOH solution is 30 to 55%.

9. The alkaline battery according to claim 8, wherein
the maximum pore diameter of the wet nonwoven fabric is 20 to 60 µm, and
the swelling ratio of the wet nonwoven fabric during immersion in the 40% by mass KOH solution is 30 to 45%.

10. The alkaline battery according to claim 8, wherein
the maximum pore diameter of the wet nonwoven fabric is 15 to 35 µm,
the liquid retention rate of the wet nonwoven fabric during immersion in the 40% by mass KOH solution is 450 to 700%, and
the swelling ratio of the wet nonwoven fabric during immersion in the 40% by mass KOH solution is 45 to 55%.

11. The alkaline battery according to claim 8, wherein the alkali-resistant cellulose fibers comprise at least one component selected from the group consisting of fibrillated solvent spun cellulose fibers and non-fibrillated cellulose.

12. The alkaline battery according to claim 9, wherein the alkali-resistant synthetic fibers comprise at least polypropylene fibers.

13. The alkaline battery according to claim 10, wherein the alkali-resistant synthetic fibers comprise at least one component selected from the group consisting of non-acetalized polyvinyl alcohol fibers and acetalized polyvinyl alcohol fibers.

14. The alkaline battery according to claim 11, wherein the non-fibrillated cellulose comprises at least regenerated cellulose fibers.

* * * * *